US012652122B2

(12) United States Patent
Berger et al.

(10) Patent No.: US 12,652,122 B2
(45) Date of Patent: Jun. 9, 2026

(54) MODULATION AND CODING SCHEME TABLE CHANGE BASED ON CONSTELLATION AND CODE RATE

(71) Applicant: QUALCOMM Incorporated, San Diego, CA (US)

(72) Inventors: Peer Berger, Hod Hasharon (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 18/333,422

(22) Filed: Jun. 12, 2023

(65) Prior Publication Data

US 2024/0413924 A1 Dec. 12, 2024

(51) Int. Cl.
*H04L 1/00* (2006.01)
*H04W 8/24* (2009.01)
*H04W 72/51* (2023.01)

(52) U.S. Cl.
CPC ............. *H04L 1/0003* (2013.01); *H04W 8/24* (2013.01); *H04W 72/51* (2023.01)

(58) Field of Classification Search
CPC ... H04L 1/0003; H04L 1/0009; H04L 1/0016; H04L 1/0022; H04L 1/0025; H04W 8/24; H04W 72/51
See application file for complete search history.

(56) References Cited

U.S. PATENT DOCUMENTS

| | | | |
|---|---|---|---|
| 2012/0120860 A1* | 5/2012 | Chui ................. | H04W 52/0229 |
| | | | 370/329 |
| 2015/0117568 A1 | 4/2015 | Wang et al. | |
| 2018/0323900 A1* | 11/2018 | Gulati .................. | H04L 1/0016 |
| 2019/0253121 A1* | 8/2019 | Islam .................... | H04L 1/0016 |
| 2020/0092818 A1 | 3/2020 | Jiang et al. | |
| 2021/0120560 A1* | 4/2021 | Kutz ..................... | H04L 1/0053 |
| 2022/0408444 A1* | 12/2022 | Horn ..................... | H04L 5/0094 |
| 2024/0413924 A1* | 12/2024 | Berger ................. | H04L 1/0025 |

OTHER PUBLICATIONS

International Search Report and Written Opinion—PCT/US2024/031390—ISA/EPO—Sep. 12, 2024.

* cited by examiner

*Primary Examiner* — Afshawn M Towfighi
(74) *Attorney, Agent, or Firm* — Procopio, Cory, Hargreaves & Savitch LLP

(57) ABSTRACT

In an aspect, a UE may transmit a first indication that the UE supports a capability to reduce power consumption associated with a constellation and code rate of at least a demodulator of the UE. The UE may receive, based on the first indication, a second indication to utilize a modulation and coding set (MCS) table from a plurality of MCS tables. The UE may receive data from a network node based on the MCS table.

30 Claims, 16 Drawing Sheets

| MCS 402 | Qm 404 | R 406 | Capability bit per MCS 408 |
|---------|--------|-------|----------------------------|
| 0 | 2 | 0.12 | 1 |
| 1 | 2 | 0.19 | 1 |
| 2 | 2 | 0.3 | 1 |
| 3 | 2 | 0.44 | 1 |
| 4 | 2 | 0.59 | 1 |
| 5 | 4 | 0.37 | 0 |
| 6 | 4 | 0.42 | 0 |
| 7 | 4 | 0.48 | 0 |
| 8 | 4 | 0.54 | 0 |
| 9 | 4 | 0.6 | 1 |
| 10 | 4 | 0.64 | 1 |
| 11 | 6 | 0.46 | 0 |
| 12 | 6 | 0.5 | 0 |
| 13 | 6 | 0.55 | 0 |
| 14 | 6 | 0.6 | 0 |
| 15 | 6 | 0.65 | 1 |
| 16 | 6 | 0.7 | 1 |
| 17 | 6 | 0.75 | 1 |
| 18 | 6 | 0.8 | 1 |
| 19 | 6 | 0.85 | 1 |
| 20 | 8 | 0.67 | 0 |
| 21 | 8 | 0.69 | 0 |
| 22 | 8 | 0.74 | 1 |
| 23 | 8 | 0.78 | 1 |
| 24 | 8 | 0.82 | 1 |
| 25 | 8 | 0.86 | 1 |
| 26 | 8 | 0.89 | 1 |
| 27 | 8 | 0.93 | 1 |

400

500

| MCS 402 | Old Qm 404 | Old R 406 | Speff 502 | New Qm 504 | New R 506 |
|---|---|---|---|---|---|
| 0 | 2 | 0.12 | 0.23 | 2 | 0.12 |
| 1 | 2 | 0.19 | 0.38 | 2 | 0.19 |
| 2 | 2 | 0.3 | 0.6 | 2 | 0.3 |
| 3 | 2 | 0.44 | 0.88 | 2 | 0.44 |
| 4 | 2 | 0.59 | 1.18 | 2 | 0.59 |
| 5 | 4 | 0.37 | 1.48 | 2 | 0.74 |
| 6 | 4 | 0.42 | 1.7 | 2 | 0.85 |
| 7 | 4 | 0.48 | 1.91 | 4 | 0.48 |
| 8 | 4 | 0.54 | 2.16 | 4 | 0.54 |
| 9 | 4 | 0.6 | 2.41 | 4 | 0.6 |
| 10 | 4 | 0.64 | 2.57 | 4 | 0.64 |
| 11 | 6 | 0.46 | 2.73 | 4 | 0.68 |
| 12 | 6 | 0.5 | 3.03 | 4 | 0.76 |
| 13 | 6 | 0.55 | 3.32 | 4 | 0.83 |
| 14 | 6 | 0.6 | 3.61 | 4 | 0.9 |
| 15 | 6 | 0.65 | 3.9 | 6 | 0.65 |
| 16 | 6 | 0.7 | 4.21 | 6 | 0.7 |
| 17 | 6 | 0.75 | 4.52 | 6 | 0.75 |
| 18 | 6 | 0.8 | 4.82 | 6 | 0.8 |
| 19 | 6 | 0.85 | 5.12 | 6 | 0.85 |
| 20 | 8 | 0.67 | 5.33 | 6 | 0.89 |
| 21 | 8 | 0.69 | 5.55 | 6 | 0.92 |
| 22 | 8 | 0.74 | 5.89 | 8 | 0.74 |
| 23 | 8 | 0.78 | 6.23 | 8 | 0.78 |
| 24 | 8 | 0.82 | 6.57 | 8 | 0.82 |
| 25 | 8 | 0.86 | 6.91 | 8 | 0.86 |
| 26 | 8 | 0.89 | 7.16 | 8 | 0.89 |
| 27 | 8 | 0.93 | 7.41 | 8 | 0.93 |

| MCS 402 | Old Qm 404 | Old R 406 | Speff 502 | New Qm 504 | New R 506 |
|---|---|---|---|---|---|
| 0 | 2 | 0.12 | 0.23 | 2 | 0.12 |
| 1 | 2 | 0.19 | 0.38 | 2 | 0.19 |
| 2 | 2 | 0.3 | 0.6 | 2 | 0.3 |
| 3 | 2 | 0.44 | 0.88 | 2 | 0.44 |
| 4 | 2 | 0.59 | 1.18 | 2 | 0.59 |
| 5 | 4 | 0.37 | 1.48 | 2 | 0.74 |
| 6 | 4 | 0.42 | 1.7 | 2 | 0.85 |
| 7 | 4 | 0.48 | 1.91 | - | - |
| 8 | 4 | 0.54 | 2.16 | - | - |
| 9 | 4 | 0.6 | 2.41 | 4 | 0.6 |
| 10 | 4 | 0.64 | 2.57 | 4 | 0.64 |
| 11 | 6 | 0.46 | 2.73 | 4 | 0.68 |
| 12 | 6 | 0.5 | 3.03 | 4 | 0.76 |
| 13 | 6 | 0.55 | 3.32 | 4 | 0.83 |
| 14 | 6 | 0.6 | 3.61 | 4 | 0.9 |
| 15 | 6 | 0.65 | 3.9 | - | - |
| 16 | 6 | 0.7 | 4.21 | 6 | 0.7 |
| 17 | 6 | 0.75 | 4.52 | 6 | 0.75 |
| 18 | 6 | 0.8 | 4.82 | 6 | 0.8 |
| 19 | 6 | 0.85 | 5.12 | 6 | 0.85 |
| 20 | 8 | 0.67 | 5.33 | 6 | 0.89 |
| 21 | 8 | 0.69 | 5.55 | 6 | 0.92 |
| 22 | 8 | 0.74 | 5.89 | - | - |
| 23 | 8 | 0.78 | 6.23 | - | - |
| 24 | 8 | 0.82 | 6.57 | 8 | 0.82 |
| 25 | 8 | 0.86 | 6.91 | 8 | 0.86 |
| 26 | 8 | 0.89 | 7.16 | 8 | 0.89 |
| 27 | 8 | 0.93 | 7.41 | 8 | 0.93 |

602   604   606   608   610

600

700
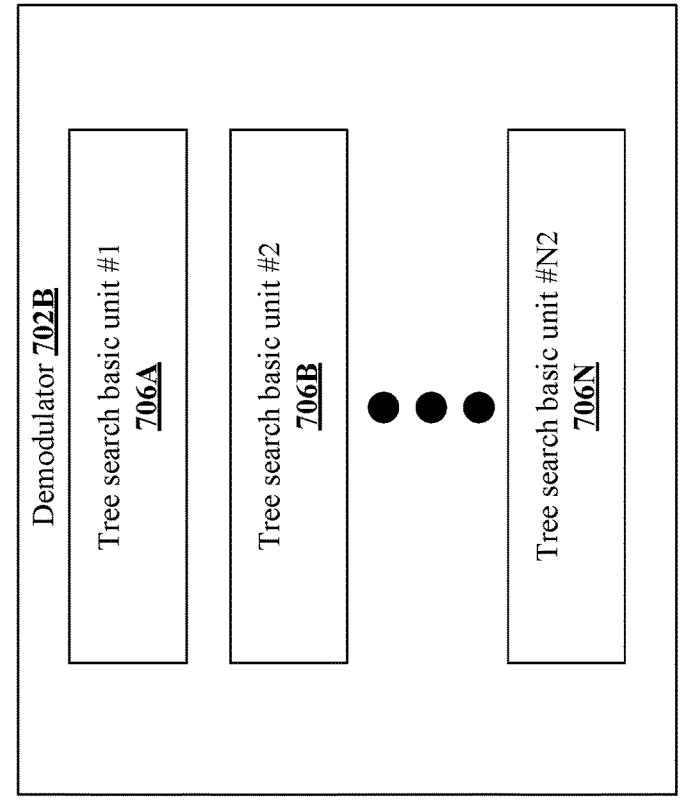
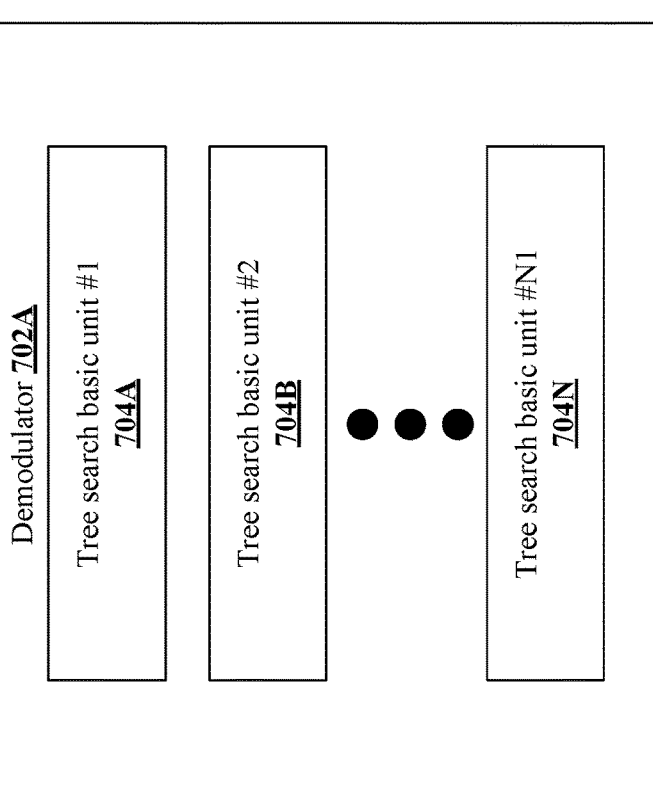
FIG. 7

1100

1102

Transmit a first indication that the UE supports a capability to reduce power consumption associated with a constellation and code rate of at least a demodulator of the UE

1104

Receive, based on the first indication, a second indication to utilize an MCS table from a plurality of MCS tables

1106

Receive data from a network node based on the MCS table

Figure 12:
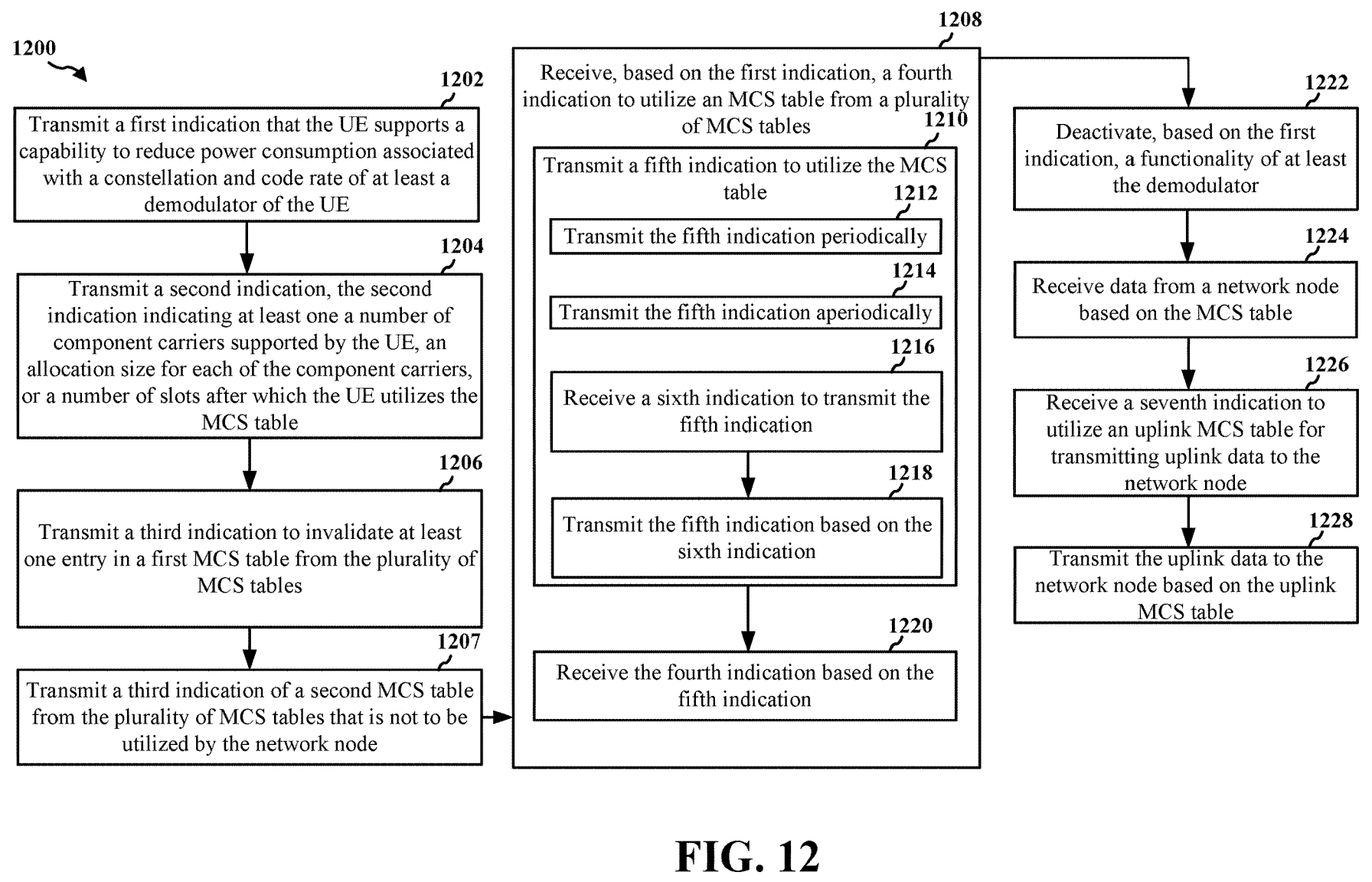

1200

1202 — Transmit a first indication that the UE supports a capability to reduce power consumption associated with a constellation and code rate of at least a demodulator of the UE 1204 — Transmit a second indication, the second indication indicating at least one a number of component carriers supported by the UE, an allocation size for each of the component carriers, or a number of slots after which the UE utilizes the MCS table 1206 — Transmit a third indication to invalidate at least one entry in a first MCS table from the plurality of MCS tables 1207 — Transmit a third indication of a second MCS table from the plurality of MCS tables that is not to be utilized by the network node

1208

Receive, based on the first indication, a fourth indication to utilize an MCS table from a plurality of MCS tables 1210 — Transmit a fifth indication to utilize the MCS table 1212 — Transmit the fifth indication periodically 1214 — Transmit the fifth indication aperiodically 1216 — Receive a sixth indication to transmit the fifth indication 1218 — Transmit the fifth indication based on the sixth indication 1220 — Receive the fourth indication based on the fifth indication 1222 — Deactivate, based on the first indication, a functionality of at least the demodulator 1224 — Receive data from a network node based on the MCS table 1226 — Receive a seventh indication to utilize an uplink MCS table for transmitting uplink data to the network node 1228 — Transmit the uplink data to the network node based on the uplink MCS table

Receive a first indication that a UE supports a capability to reduce power consumption associated with a constellation and code rate of at least a demodulator of the UE

1304

Transmit, based on the first indication, a second indication to utilize an MCS table from a plurality of MCS tables

1306

Transmit data, for the UE, based on the MCS table

Figure 14:
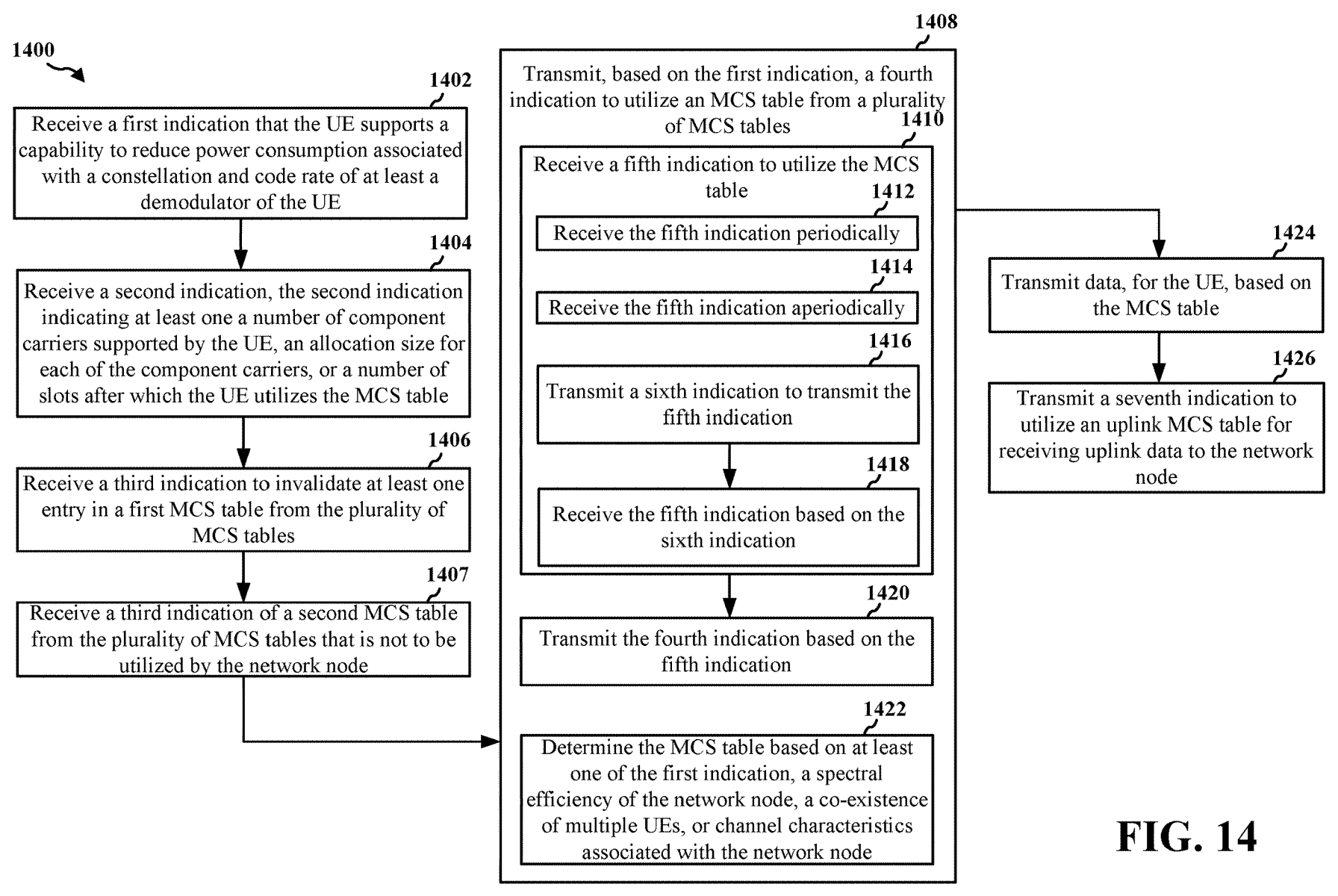

1402 Receive a first indication that the UE supports a capability to reduce power consumption associated with a constellation and code rate of at least a demodulator of the UE 1404 Receive a second indication, the second indication indicating at least one a number of component carriers supported by the UE, an allocation size for each of the component carriers, or a number of slots after which the UE utilizes the MCS table 1406 Receive a third indication to invalidate at least one entry in a first MCS table from the plurality of MCS tables 1407 Receive a third indication of a second MCS table from the plurality of MCS tables that is not to be utilized by the network node 1408 Transmit, based on the first indication, a fourth indication to utilize an MCS table from a plurality of MCS tables 1410 Receive a fifth indication to utilize the MCS table 1412 Receive the fifth indication periodically 1414 Receive the fifth indication aperiodically 1416 Transmit a sixth indication to transmit the fifth indication 1418 Receive the fifth indication based on the sixth indication 1420 Transmit the fourth indication based on the fifth indication 1422 Determine the MCS table based on at least one of the first indication, a spectral efficiency of the network node, a co-existence of multiple UEs, or channel characteristics associated with the network node 1424 Transmit data, for the UE, based on the MCS table 1426 Transmit a seventh indication to utilize an uplink MCS table for receiving uplink data to the network node

MODULATION AND CODING SCHEME TABLE CHANGE BASED ON CONSTELLATION AND CODE RATE

TECHNICAL FIELD

The present disclosure relates generally to communication systems, and more particularly, to wireless communication including a modulation and coding scheme (MCS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus may include at least one memory and at least one processor coupled to the at least one memory. The at least one processor, individually or in any combination, and based at least in part on information stored in the at least one memory may be configured to transmit a first indication that the UE supports a capability to reduce power consumption associated with a constellation and code rate of at least a demodulator of the UE, to receive, based on the first indication, a second indication to utilize an MCS table from a plurality of MCS tables, and to receive data from a network node based on the MCS table.

In another aspect of the disclosure, a method, a computer-readable medium, and an apparatus for wireless communication at a network node are provided. The apparatus may include at least one memory and at least one processor coupled to the at least one memory. The at least one processor, individually or in any combination, and based at least in part on information stored in the at least one memory may be configured to receive a first indication that a UE supports a capability to reduce power consumption associated with a constellation and code rate of at least a demodulator of the UE, to transmit, based on the first indication, a second indication to utilize an MCS table from a plurality of MCS tables, and to transmit data, for the UE, based on the MCS table.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 depicts a diagram illustrating a decrease in hardware size in accordance with various aspects of the present disclosure.

FIG. 12 is a flowchart illustrating methods of wireless communication in accordance with various aspects of the present disclosure.

FIG. 14 is a flowchart illustrating methods of wireless communication in accordance with various aspects of the present disclosure.

DETAILED DESCRIPTION

Figure 1:
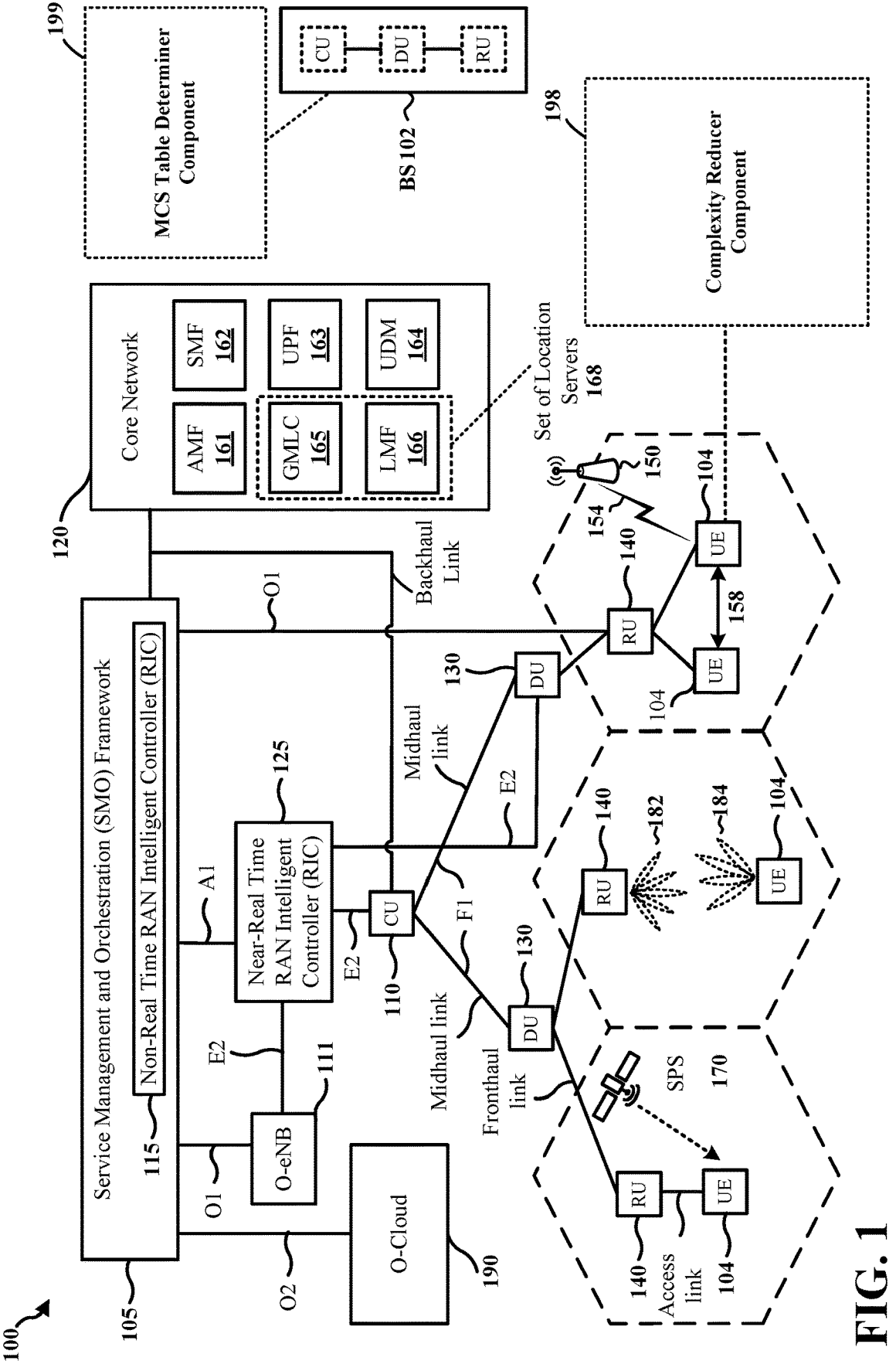
FIG. 1 is a diagram illustrating an example of a wireless communications system and an access network.

Various aspects of the present disclosure, in connection with the accompanying drawings, relate generally to communication systems. Some aspects more specifically relate to changing the MCS table utilized for wireless communication. In some examples, a UE may signal to a network node that it has the capability to reduce power consumption of one or more hardware components thereof (e.g., a demodulator, a decoder, etc.). The network node may determine whether a different MCS table is to be utilized for communication based on the UE's capability and/or along with other factors (e.g., spectral efficiency of the network node, channel characteristics associated with the network node, etc.). The different MCS table may support lower constellation(s) and/or higher code rate(s). In the event that the network node determines that a different MCS table is to be utilized, the network node may provide an indication to the UE to utilize the different MCS table and may transmit data to the UE based on the MCS table. The UE may demodulate and decode the received data based on the different MCS table.

Particular aspects of the subject matter described in this disclosure can be implemented to realize one or more of the following potential advantages. In some examples, by switching to an MCS table with lower constellation(s) and/or higher code rate(s), the demodulator of the UE may experience less errors for the decoder of the UE to correct. Accordingly, the UE works less by not having correct as many errors, and therefore, conserves various compute resources, such as processing cycles, memory, power, etc. The use of different MCS tables enables a reduction in UE complexity and power savings wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller

6

(RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE

104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a complexity reducer component 198 that may be configured to transmit a first indication that the UE supports a capability to reduce power consumption associated with a constellation and code rate of at least a demodulator of the UE, to receive, based on the first indication, a second indication to utilize an MCS table from a plurality of MCS tables, and to receive data from a network node based on the MCS table. In certain aspects, the base station 102 may have an MCS table determiner component 199 that may be configured to receive a first indication that a UE supports a capability to reduce power consumption associated with a constellation and code rate of at least a demodulator of the UE, to transmit, based on the first indication, a second indication to utilize an MCS table from a plurality of MCS tables, and to transmit data, for the UE, based on the MCS table.

Figures 2A, 2B, 2C, 2D:
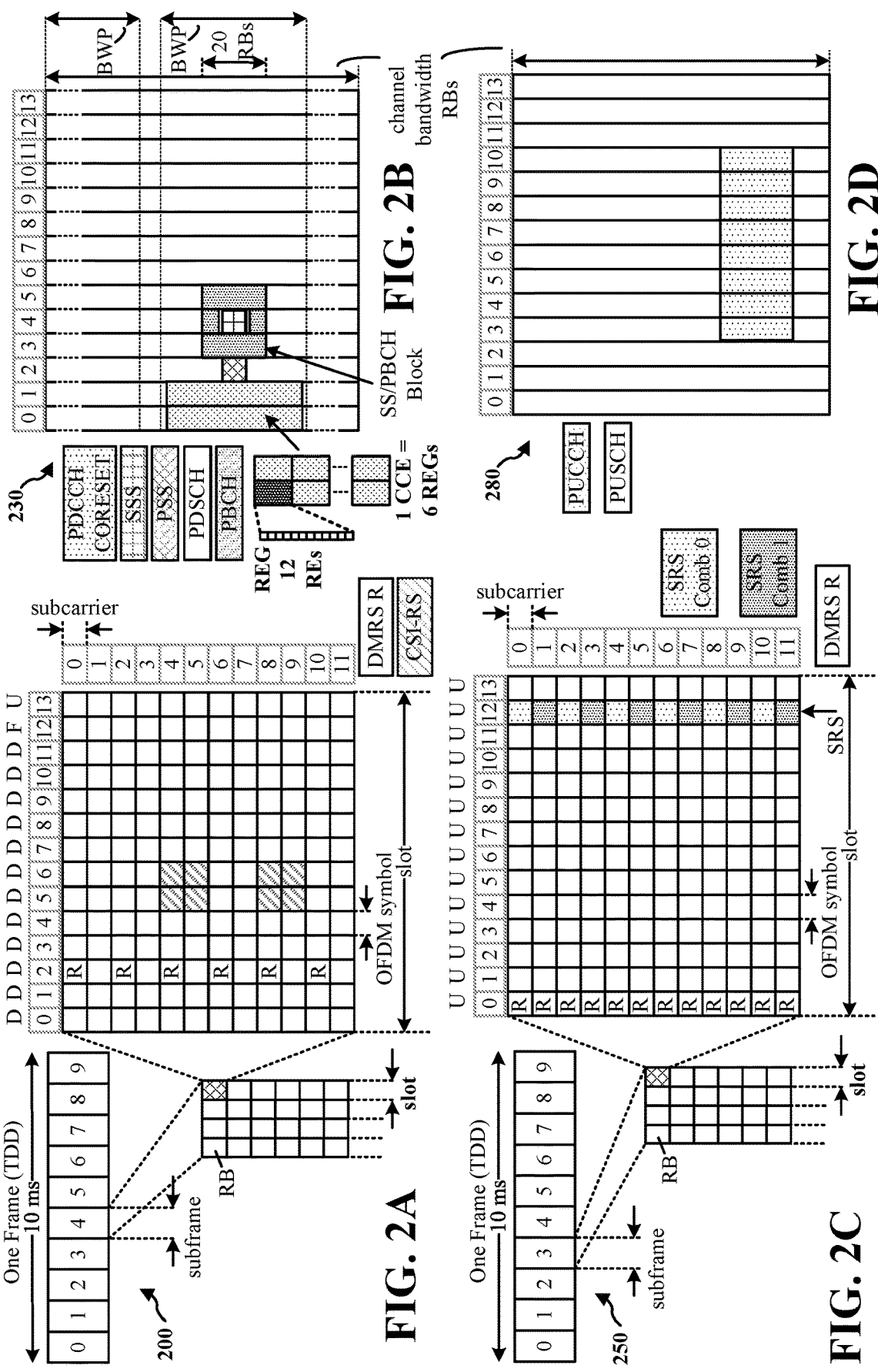
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
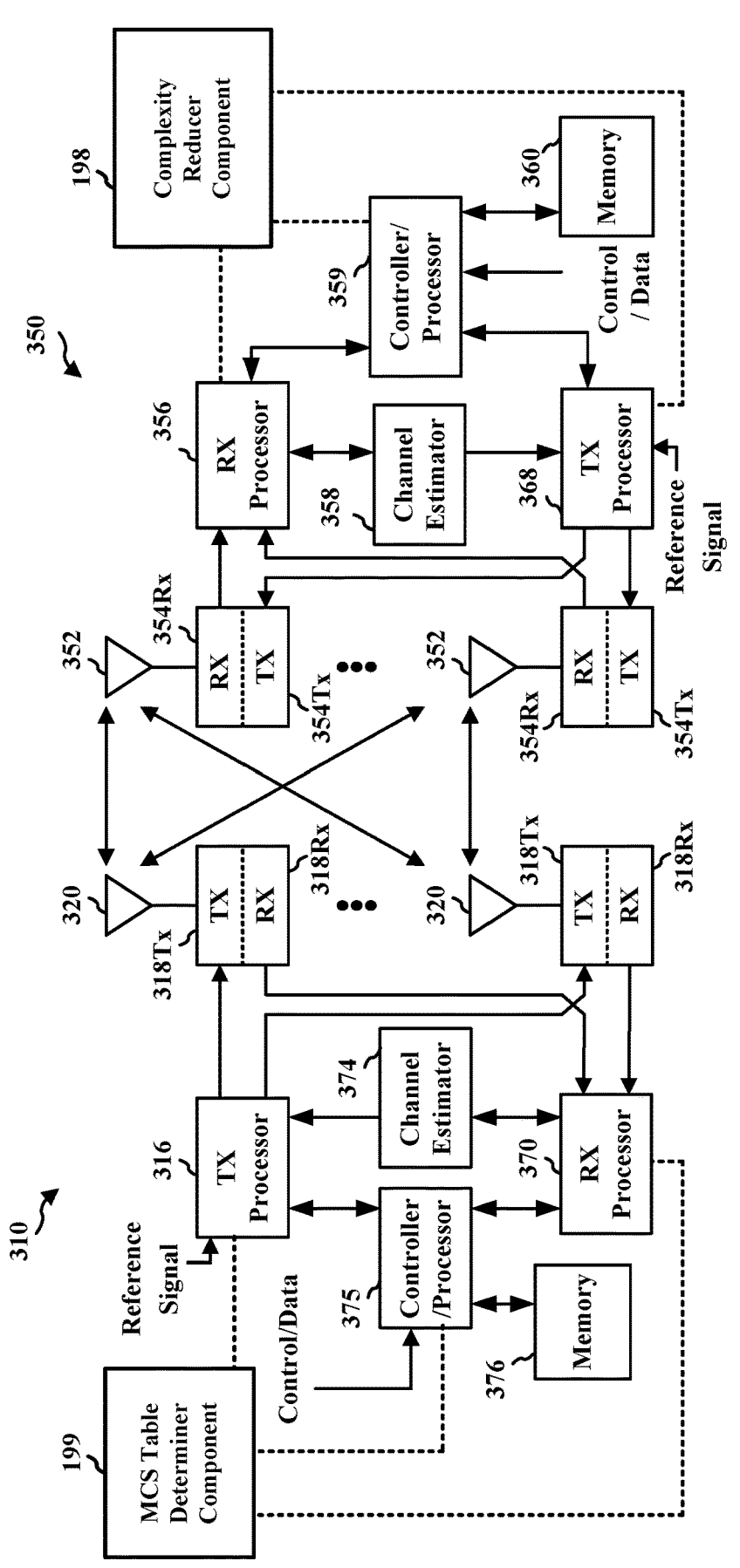
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the complexity reducer component 198 of FIG. 1.

At least one of the TX processor 316, the RX processor 370, and the controller/processor 375 may be configured to perform aspects in connection with the MCS table determiner component 199 of FIG. 1.

An MCS table may indicate a list of modulation and coding schemes that may be utilized to transmit data between a network node (e.g., a gNB) and a UE. Data may initially be transmitted utilizing a lower order constellation (e.g., QPSK) and a lower code rate. The code rate may be increased based on the lower order constellation. When a certain code rate is reached, the transmitting entity may switch to a higher order constellation (e.g., 16/64/256-QAM, etc.) and a lower code rate associated with the higher order constellation. The code rate at which the switch is made to a different constellation may be referred to as a switching code rate. In accordance with the various aspects described herein, the switching code rate may vary depending on the MCS table utilized, the constellation, the application, etc.

When there are multiple layers, a UE receiver (e.g., an advanced UE receiver) may use a machine learning (ML)-based or a near ML-based demodulator. The demodulator may perform per-stream recursive demapping. The demodulator may be one of the largest power consumers in the receiver. In implementations (e.g., including 6G or other implementations) that utilize higher rates, aspects that reduce power consumption can help to extend battery life for receivers. The constellation used for wireless communication affects the complexity of the demodulator. For example, a higher constellation may result in a larger search space, and therefore a greater complexity. Additionally, or alternatively, the code rate affects the complexity of the receiver. For example, a higher code rate may result in a lower uncoded bit error rate (BER) and a simpler demodulation/lesser complexity than a lower code rate.

Aspects presented provide a solution that enables a UE and a network to coordinate a reduction in complexity at the UE, and power savings at the UE, based on a UE capability to decrease complexity as a function of constellation and/or code rate and through the use of different MCS tables.

In accordance with various aspects of the present disclosure, a UE may report whether it has a capability to decrease the complexity as a function of the constellation and code rate. Additionally, or alternatively, the UE may request to change the constellation code-rate tradeoff (e.g., switch the constellation at a higher code rate) in order to decrease power consumption. The network node may use a different MCS table that switches to a lower order constellation with higher code rates to help the UE decrease power consumption through a reduction in receiver complexity. In some aspects, additional MCS tables may be added to work with lower constellation orders and higher rates to help decrease power consumption at a receiver.

As described herein, a UE may report whether it has a capability to decrease the complexity as a function of the constellation and code rate. In some aspects, the capability may be reported in connection with reporting other types of capabilities. For instance, the UE may report, or otherwise indicate, the capability utilizing any of RRC-based signaling, a MAC-control element (CE), uplink control information (UCI), etc. The UE may request to change the MCS table to one with a lower constellation and higher code rate in order to decrease power consumption. This request may be indicated via a periodic report, in some aspects. The network may configure the UE to send the periodic report. In some aspects, the request may be indicated in an aperiodic report. The aperiodic report may be triggered by a network node, or may be triggered by the UE, e.g., based on an occurrence of a condition that triggers the UE to send an aperiodic request. In some demodulators, the decision to transmit the request may be channel dependent (e.g., correlation may influence a linear minimum mean square error (LMMSE) demodulator), and therefore, may change over time. Various aspects described herein may also be applied for uplink MCS tables, where the network node may determine an uplink MCS table in order to save power. The selection of the MCS table may also be channel dependent, e.g., based on one or more channel conditions for the corresponding channel, and therefore, may change over time.

The network node may consider the UE capabilities and request(s) provided by the UE when selecting the MCS table, e.g., in order to help the UE decrease power consumption. A UE may rely on its capability (for example, by defining a dedicated UE category) to reduce its demodulator hardware size, which will reduce cost and power consumption.

Figure 4:
FIG. 4 depicts an MCS table in accordance with various aspects of the present disclosure.

In some aspects, the UE may further indicate preferences relating to MCSs. In one aspect, a UE may report one or more MCSs for which the UE does not want to be configured within a configured MCS table. For instance, the UE may indicate which index(es) corresponding to the MCS(s) with which the UE does not prefer to be configured. For instance, the UE may report such index(es) as part of its capability information (e.g., providing a bit per MCS per MCS table, each bit indicating if a corresponding MCS is unfavored). For example, FIG. 4 depicts an MCS table 400 in accordance with various aspects of the present disclosure. As shown in FIG. 4, the MCS table 400 may include an MCS index column 402, a modulation order column 404, a code rate field 406. FIG. 4 also shows a column with an additional capability field 408. The MCS index column 402 may include one or more indexes, each corresponding to a particular MCS. The modulation order column 404 may indicate, for each index, the modulation order utilized for the associated MCS. The code rate field 406 may indicate, for each index, the code rate utilized for the associated MCS. The capability field 408 shows an indication, for each index that the UE favors or does not favor the associated MCS. In the example shown in FIG. 4, the UE may indicate, via capability signaling, that it does not favor or does not prefer (e.g., that the UE prefers to not be configured with) MCSs 5-8, 11-14, and 20-21. Accordingly, the values in the capability field 408 for corresponding indexes 5-8, 11-14, and 20-21 may include a value (e.g., "0") indicating the UE preference. The values stored in the capability field for the other indexes may include a value (e.g., "1") that indicates that the UE favors, prefers, or accepts, the associated MCSs.

Figure 5:
FIG. 5 depicts an MCS table in accordance with various aspects of the present disclosure.

In another aspect, a different MCS table may be utilized that does not include spectral efficiency (Speff) gaps. For example, FIG. 5 depicts an MCS table 500 in accordance with various aspects of the present disclosure. As shown in FIG. 5, the modulation order column 404 and the code rate field 406 from the table in FIG. 4 are replaced with a modulation order column 504 and a code rate field 506 including different values. The MCS table 500 may include higher rates for one or more MCSs while maintaining the spectral efficiency (e.g., the amount of data that can be transmitted over a particular bandwidth), as indicated in the spectral efficiency field 502. The network may have information about a channel, e.g., CSI measurements from a UE or measurement of an SRS received from the UE. The network may select the MCS from an MCS table based on the channel conditions. As an example, the network may select a highest MCS that appears to enable the UE to receive the communication correctly. The higher spectral efficiency enables the network to send more data to the UE, whereas a lower spectral efficiency is more likely to be accurately received by a UE having a lower SNR. The table in FIG. 5 increases the density of options for the various QAM, e.g., and provides improved spectral efficiency by increasing the granularity in the selection between different MCS. For instance, the modulation order and the rate of MCS 5 may be changed to 2 and 0.74, respectively, the modulation order and the rate of MCS 6 may be changed to 2 and 0.085, respectively, the modulation order and the rate of MCS 11 may be changed to 4 and 0.68, respectively, the modulation order and the rate of MCS 12 may be changed to 4 and 0.76, respectively, the modulation order and the rate of MCS 13 may be changed to 4 and 0.83, respectively, the modulation order and the rate of MCS 14 may be changed to 4 and 0.9, respectively, the modulation order and the rate of MCS 20 may be changed to 6 and 0.89, respectively, and the modulation order and the rate of MCS 21 may be changed to 6 and 0.98, respectively. A similar adjustment may be made for other MCS tables (e.g., there may be no table where all the switching points between constellations occurs in the highest code rate 948/1024~=0.93) in all the options. As also shown in FIG. 5, the spectral efficiency remains the same between the original modulation order and code rates and the updated modulation order and code rates. In some aspects, the MCS table 500 may be preconfigured for the UE or defined (e.g., defined in a wireless standard, known in advance by the network and the UE, preconfigured in advance of communication with the network, etc.), or alternatively, may be configured for the UE and/or signaled to the UE by the network (e.g., a network node or a component of the core network).

Figure 6:
FIG. 6 depicts an MCS table in accordance with various aspects of the present disclosure.

In a further aspect, a different MCS table may be utilized that includes spectral efficiency (Speff) gaps. For example, FIG. 6 depicts an MCS table 600 in accordance with various aspects of the present disclosure. As shown in FIG. 6, the MCS table 600 may include relatively higher rates when compared to the MCS table 400, but there are spectral efficiency gaps (indicated by a dash "-", for example for rows 602, 604, 606, 608, and 610). In particular, for the rows 602, 604, 606, 608, and 610, spectral efficiency options may not be available (e.g., higher code rate values that would result in equivalent spectral efficiencies may not be available). In some aspects, the MCS table 600 may be configured or defined (e.g., defined in a wireless standard, known in advance by the UE and network, preconfigured for the UE before communication with the network, etc.), or alternatively, may be configured for the UE, and/or signaled to the UE by the network (e.g., a network node or a component of the core network).

In some aspects, the UE may signal via one or more bit that the UE supports a capability to decrease the complexity of the demodulator as a function of constellation and code rate. In some aspects, the UE may signal via a single bit (e.g., one bit) to indicate the capability to decrease the complexity of the demodulator as a function of constellation and code rate. In other aspects, the UE may signal the capability individually for hardware blocks at the UE. As an example, the UE may transmit one bit per hardware block for which the complexity may be reduced as a function of constellation and code rate. For instance, the UE may reduce the complexity of different hardware blocks (e.g., the demodulator and a decoder, as such hardware blocks are both influenced by the MCS table (i.e., the constellation/ code rate). In either of the aspects described above, the UE may also signal the number of component carriers supported thereby (e.g., for which the UE has the capability to reduce the complexity as a function of constellation and code rate) and/or the allocation size of such component carriers. The UE may also signal a configuration response duration of the UE (e.g., the UE may support the new MCS table configuration after X slots, where is an integer greater than or equal to 0. A value of 0 for X may indicate that the new MCS table may be configured in DCI for the same slot. That is, the UE may support and/or utilize the new MCS table in the same slot in which the new MCS table configuration is received.

In some aspects, a network node may consider other aspects (in addition to or in lieu of the UE power consumption and preferences (as indicated via a UE request, as described above)) to determine whether a new MCS should be utilized. As an example of one aspect that the network may consider is spectral efficiency. For instance, the network node may want to be spectral efficient (for example, because bandwidth is a limited resource). Another aspect considered by the network may be UE co-existence (e.g., multiple-user MIMO (MU-MIMO). In MU-MIMO, a UE may use a joint demodulator and/or a successive interference cancellation (SIC) receiver (e.g., a UE may decode other UE messages to improve its own decoding). In this code, the network node may use the same table for several UEs to help a UE with a SIC demodulator (this may also help the network node save power when the receiver works on other UEs). A further aspect considered by the network may be scenario-specific, channel-based, and/or interference-based. For example, some demodulator options may be channel dependent. The network node may determine whether or not a different MCS is to be utilized based on channel conditions. In addition, lower rates may help when dealing with interference.

In some aspects, the inputs for the demodulator may be the received signal and the channel estimation, while the output is a log-likelihood ratio (LLR) (e.g., of the coded bits at the UE). The LLR may be a soft decision that indicates the likelihood of the coded bit being a 1 or 0. The demodulator may be represented as a tree search procedure. Different algorithms may be different ways to arrange and scan the tree in different ways (traversing the entire tree may equal the maximum likelihood). A possible hardware design may include several "basic units". The amount of "basic units" may be designed to support the worst-case scenario (e.g., maximal bandwidth, hardest channel, most demanding MCS, etc.). The most demanding MCS may be the lowest rate of the highest constellation. The worst case may dictate the hardware size, and the hardware size may influence power consumption, hardware cost, etc. In accordance with various aspects of the present disclosure, the hardware size may be reduced (e.g., less units may be utilized) and/or power may be saved by shutting down (e.g., clock gating) unneeded units opportunistically.

For instance, FIG. 7 depicts a diagram 700 illustrating a decrease in hardware size in accordance with various aspects of the present disclosure. As shown in FIG. 7, a first demodulator 702A may include N1 tree search basic units 704A, 704B, . . . , 704N (704-704N). As further shown in FIG. 7, a second demodulator 702B may include N2 tree search basic units 706A, 706B, . . . , 706N, where N2 is less than N1. The second demodulator 702B may utilize less hardware (e.g., the second demodulator 702B may have a smaller silicon footprint) because it may utilize lower code rates, as the worst case scenarios are excluded from the MCS tables. Because such scenarios are excluded, less hardware may be utilized by the second demodulator 702B.

Figure 8:
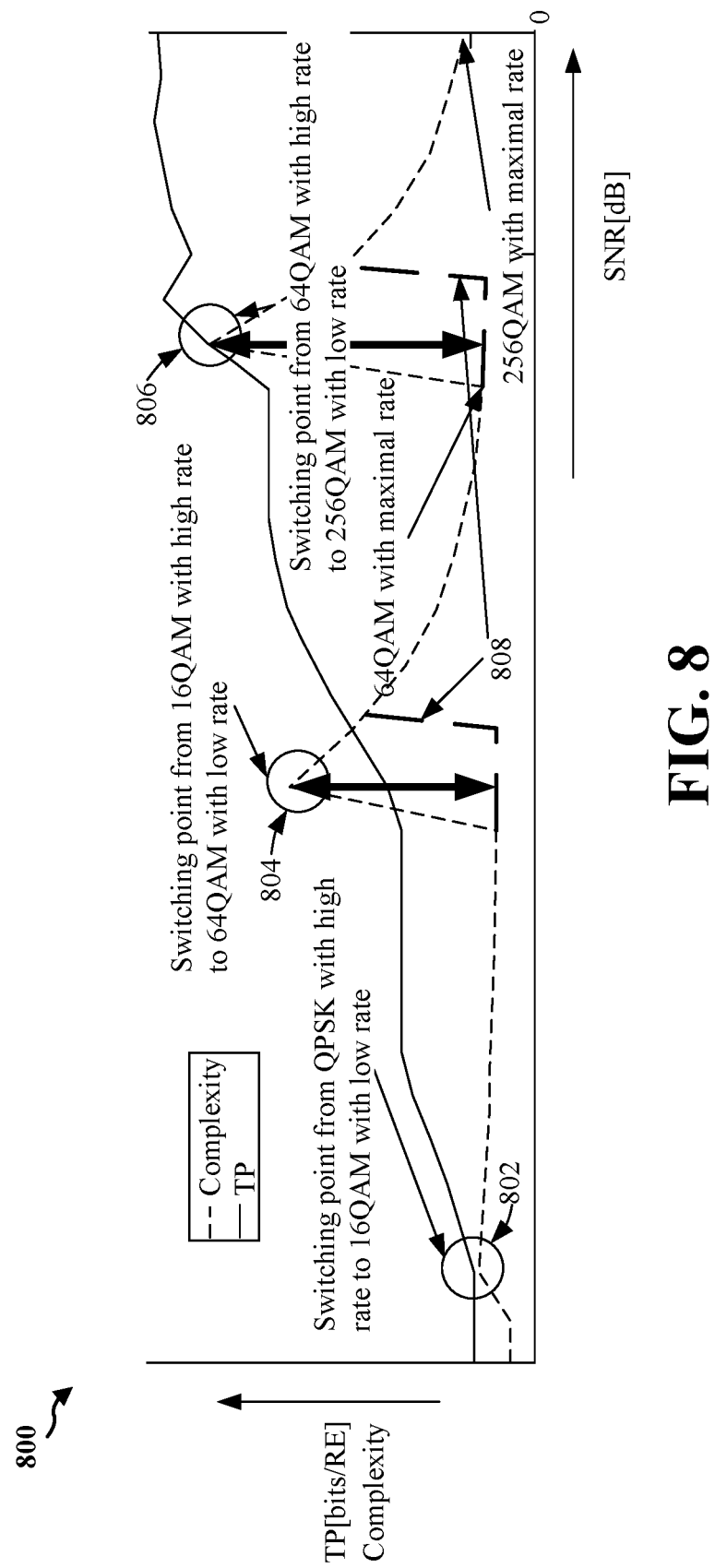
FIG. 8 depicts a diagram illustrating the complexity savings in accordance with various aspects of the present disclosure.

FIG. 8 depicts a diagram 800 illustrating examples of switch points that may provide a complexity savings in accordance with various aspects of the present disclosure. In the example shown in FIG. 8, a simple algorithm may classify resource elements (REs) using a near-ML demodulator (or a much simpler demodulator, such as an MMSE demodulator). The classification may be performed by a neural network or using another metric. As illustrated in FIG. 8, the complexity of the demodulator increases as the constellation increases, and the complexity of the demodulator decreases as the code rate increases (e.g., at points 802, 804, and 806). In accordance with various aspects of the present disclosure, MCS tables (e.g., the MCS tables 400, 500, and 600) that do not include the lower code rates may result in lower complexity. For instance, as shown in FIG. 8, line 808 demonstrates the decrease in complexity utilizing such MCS tables.

The improvement in power consumption may be an attribute of the MCS table. When the code rate is lower, the demodulator may have more errors that will be corrected in the decoder (e.g., using low-density parity checking (LDPC). In the presence of more uncoded BER, the demodulator may work harder, which translates into more power.

Figures 9A, 9B, 9C:
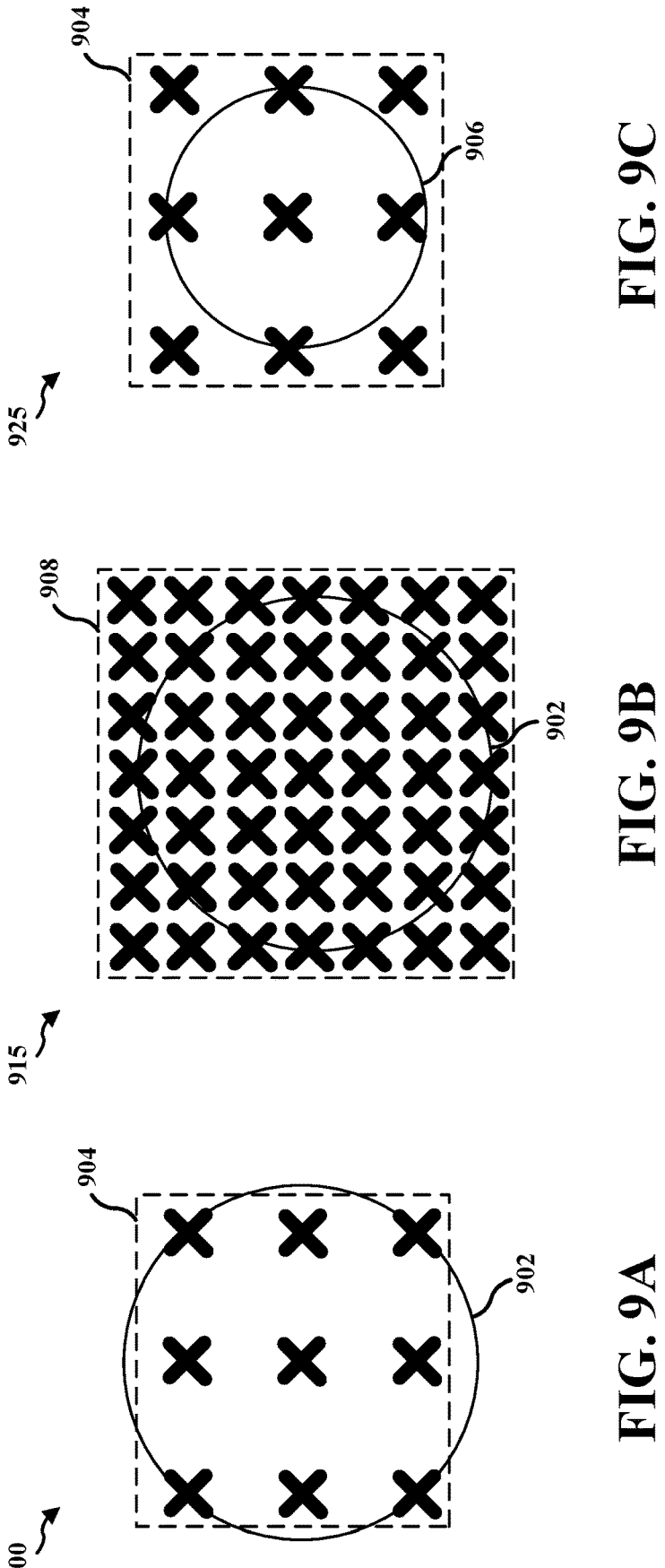
FIG. 9A depicts a diagram illustrating a noise cloud mapped to a constellation.
FIG. 9B depicts a diagram illustrating a noise cloud mapped to a constellation.
FIG. 9C depicts a diagram illustrating a noise cloud mapped to a constellation.

The SNR may dictate the noise cloud of a constellation mapping. For example, FIG. 9A-9C depict diagrams 900, 915, and 925 illustrating noise clouds mapped to constellations. For the same constellation, a higher code rate may be chosen for higher SNR, which means that the noise cloud may not cover many constellation points. For instance, as shown in FIGS. 9A and 9C, the same constellation may be mapped to different sized noise clouds (e.g. noise clouds 902 and 906). As shown in FIG. 9A, the noise cloud 902 mostly covers the points (or symbols of the constellation 904. However, as shown in FIG. 9C, a smaller number of symbols of the constellation 904 fit in the smaller noise cloud 906. For the same SNR (i.e., the same noise cloud), a higher constellation means that the constellation points are denser. For example, as shown in FIG. 9B, more symbols of the larger constellation 908 fits in the same noise cloud (i.e., noise cloud 902) of FIG. 9A.

When using a near-ML demodulator (e.g., a sphere decoder), the power consumption may be proportional to the number of symbols within the noise cloud. Although improvements in power consumption may depend on the scenario and on the UE algorithm, MCS tables (as described herein) may influence the ability to save power.

Figure 10:
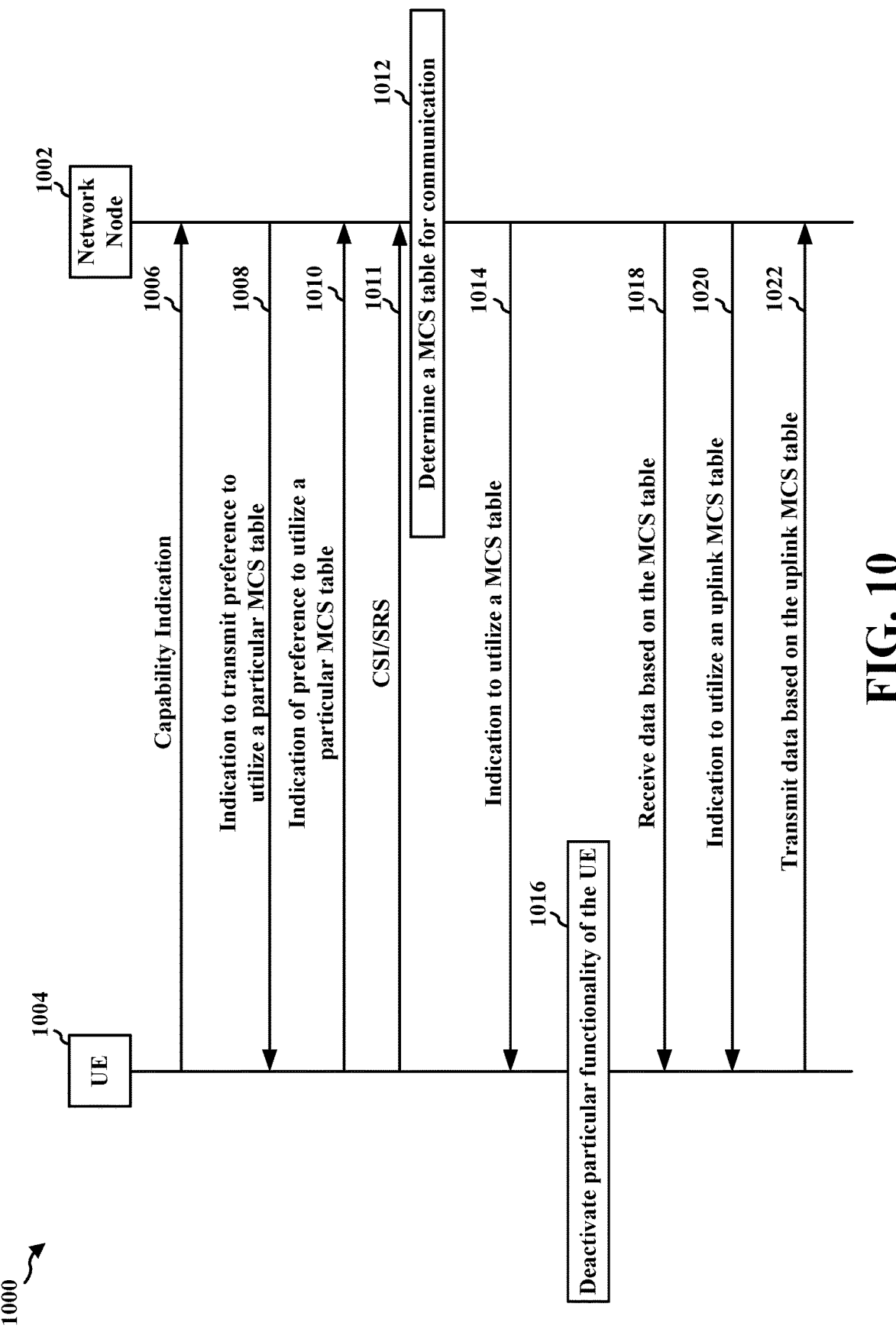
FIG. 10 is a call flow diagram illustrating a method of wireless communication in accordance with various aspects of the present disclosure.

FIG. 10 is a call flow diagram 1000 illustrating a method of wireless communication in accordance with various aspects of the present disclosure. As shown in FIG. 10, the call flow diagram 1000 includes a network node 1002 and a UE 1004. The UE 1004 may be an example of the UE 104 or the UE 350. The network node 1002 may be an example of the base station 102 or the base station 310. Although aspects are described for the network node 1002, the aspects may be performed by the network node 1002 in aggregation and/or by one or more components of the network node 1002 (e.g., such as a CU 110, a DU 130, and/or an RU 140).

As shown in FIG. 10, at 1006, the UE 1004 may transmit, to the network node 1002, an indication that the UE 1004 supports a capability to reduce power consumption associated with a constellation and code rate of one or more hardware components (e.g., a demodulator, a decoder, etc.) of the UE 1004. In some aspects, the indication may also indicate at least one of component carriers supported by the UE 1004, an allocation size for each of the component carriers, or a number of slots after which the UE utilizes an MCS table indicated by the network node 1002. In other aspects, the UE 1004 may transmit another indication, for example, during, before or after 1006, that indicates at least one of component carriers supported by the UE 1004, an allocation size for each of the component carriers, or a number of slots after which the UE utilizes an MCS table indicated by the network node 1002.

In some aspects, the indication transmitted at 1006 may include one bit that indicates that the UE 1004 supports the capability to reduce the power consumption of the demodulator of the UE 1004. For example, the UE 1004 may be able to deactivate certain functionality of the UE 1004, such as certain functionality of the demodulator of the UE 1004. In one example, the UE 1004 may deactivate functionality of the demodulator that is configured to demodulate data received at higher constellations and/or lower code rates. Deactivating such functionality may enable the UE 1004 to conserver power, among other compute resources (e.g., processing cycles, memory, etc.)

In some aspects, the indication transmitted at 1006 may include a first bit associated with the demodulator that indicates that the UE 1004 supports the capability to reduce the power consumption of the demodulator of the UE, and may include a second bit associated with a decoder of the UE 1004 that indicates that the UE 1004 supports the capability to reduce the power consumption of the decoder of the UE 1004. For example, the UE 1004 may be able to deactivate certain functionality of the UE 1004, such as certain functionality of the demodulator and/or decoder of the UE 1004. In one example, the UE 1004 may deactivate functionality of the demodulator and/or decoder that is configured to demodulate and/or decode data received at higher constellations and/or lower code rates. Deactivating such functionality may enable the UE 1004 to conserver power, among other compute resources (e.g., processing cycles, memory, etc.)

In some aspects, the network node 1002 may provide an indication, to the UE 1004, to transmit a preference to utilize a particular MCS table at 1008.

At 1010, the UE 1004 may transmit, to the network node 1002, an indication of a preference to utilize a particular MCS table. In some aspects, the indication is transmitted based on receiving the indication from the network node at 1008. In aspects in which the UE 1004 does not receive an indication at 1008, the UE 1004 may transmit the indication at 1010 periodically or aperiodically. In some aspects, the indication transmitted at 1010 may indicate that at least one entry in a particular MCS table of a plurality of MCS tables is to be invalidated (i.e., that the UE 1004 does not want to utilize at least one MCS corresponding to the at least one entry) or may indicate that a particular MCS table of the plurality of MCS tables is not to be utilized by the network node 1002 (i.e., that the UE 1004 does not want to utilize the particular MCS table).

FIG. 10 illustrates that the UE 1004 may provide information about the channel to the network node 1002. As an example, the UE may provide CSI, e.g., based on measurements of CSI-RS from the network node. As another example, the UE 1004 may transmit SRS, and the network node 1002 may measure the SRS to determine the channel information.

At 1012, the network node 1002 may determine an MCS table, from a plurality of MCS tables) based on the indication received at 1010. In some aspects, the network node 1002 may determine the MCS table based on indication received at 1010 and at least one of a spectral efficiency of the network node 1102, a co-existence of multiple UEs or channel characteristics associated with the network node 1002. The selection of the MCS may be based, at least in part, on information about the channel, such as the information received from the UE at 1011.

At 1014, the network node 1002 may provide, to the UE 1004, an indication to utilize the determined MCS table.

At 1016, the UE 1004 may deactivate particular functionality (e.g., the demodulator, the decoder, etc.) of the UE 1004, for example, based on the indication transmitted at 1006. For example, the UE 1004 may deactivate functionality of the demodulator and/or decoder that is configured to demodulate and/or decode data received at higher constellations and/or lower code rates (e.g., via clock gating (i.e., disabling the clock to components configured to perform such functionality)). Deactivating such functionality may enable the UE 1004 to conserve power, among other compute resources (e.g., processing cycles, memory, etc.)

At 1018, the network node 1002 may transmit data to the UE 1004 (and the UE 1004 may receive data from the network node 1002) based on the MCS table indicated at 1014.

In some aspects, at 1020, the network node 1002 may provide an indication to the UE 1004 to utilize an uplink MCS table for uplink transmissions. In some aspects, the network node 1002 may provide such an indication based on receiving an indication from the UE 1004 (e.g., at 1006) that indicates that the UE 1004 supports the capability to utilize uplink MCS table(s) indicated by the network node 1002.

At 1022, the UE 1004 may transmit data to the network node 1002 (and the network node 1002 may receive data from the UE 1004) based on the uplink MCS table. In some aspects, the network node 1002 may deactivate particular functionality (e.g., the demodulator, the decoder, etc.) of the network node 1002, for example, based on the uplink MCS table indicated at 1020. For example, the network node 1002 may deactivate functionality of the demodulator and/or decoder that is configured to demodulate and/or decode uplink data associated with constellations and/or code rates not indicated in the uplink MCS table indicated at 1020). Deactivating such functionality may enable the network node 1002 to conserve power, among other compute resources (e.g., processing cycles, memory, etc.).

Figure 11:
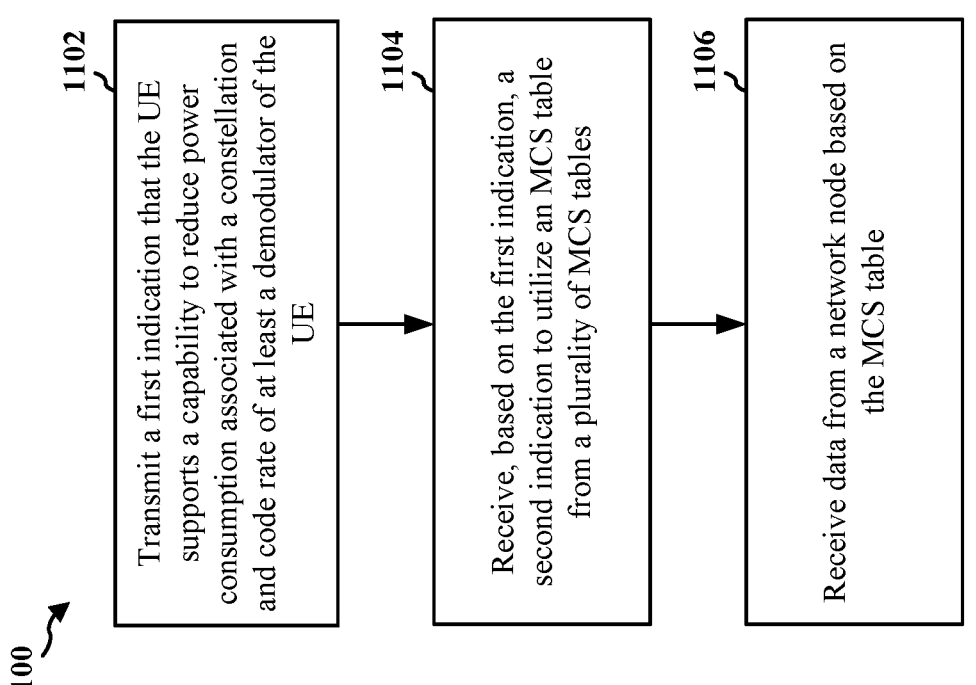
FIG. 11 is a flowchart illustrating methods of wireless communication in accordance with various aspects of the present disclosure.

FIG. 11 is a flowchart 1100 illustrating methods of wireless communication at a UE in accordance with various aspects of the present disclosure. In some aspects, the UE may be the UE 104, the 350, or the UE 1004, or the apparatus 1504 in the hardware implementation of FIG. 15.

At 1102, the UE may transmit a first indication that the UE supports a capability to reduce power consumption associated with a constellation and code rate of at least a demodulator of the UE. For example, referring to FIG. 10, at 1006, the UE 1004 may transmit a first indication that the UE 1004 supports a capability to reduce power consumption associated with a constellation and code rate of at least a demodulator of the UE 1004. In an aspect, 1102 may be performed by the complexity reducer component 198.

In some aspects, the first indication may include a bit that indicates that the UE supports the capability to reduce the power consumption of the demodulator of the UE. For example, referring to FIG. 10, the indication provided at 1006 may include a bit that indicates that the UE 1004 supports the capability to reduce the power consumption of the demodulator of the UE.

In some aspects, the first indication may include a first bit associated with the demodulator and indicates that the UE supports the capability to reduce the power consumption of the demodulator of the UE, and may include a second bit associated with a decoder of the UE and indicates that the UE supports the capability to reduce the power consumption of the decoder of the UE. For example, referring to FIG. 10, the indication provided at 1006 may include a first bit associated with the demodulator and indicates that the UE 1004 supports the capability to reduce the power consumption of the demodulator of the UE 1004, and may include a second bit associated with a decoder of the UE 1004 and indicates that the UE 1004 supports the capability to reduce the power consumption of the decoder of the UE 1004.

At 1104, the UE may receive, based on the first indication, a second indication to utilize an MCS table from a plurality of MCS tables. For example, referring to FIG. 10, at 1014, the UE 1004 may receive, based on the first indication transmitted at 1006, a second indication to utilize an MCS table from a plurality of MCS tables. In an aspect, 1104 may be performed by the complexity reducer component 198.

In some aspects, the UE may receive the second indication by transmitting a third indication to utilize the MCS table, where the second indication is received based on the third indication. For example, referring to FIG. 10, at 1010, the UE 1004 may transmit an indication to utilize the MCS table (e.g., a preference to utilize the MCS table), and at 1014, the UE 1004 may receive the indication to utilize the MCS table (e.g., prior to receiving the second indication and/or after the network node 1002 determines that such an MCS table is to be utilized, for example, at 1012).

In some aspects, the UE may transmit the third indication by at least one of transmitting the third indication periodically or transmitting the third indication aperiodically. For example, referring to FIG. 10, at 1010, the UE 1004 may transmit the indication to utilize a particular MCS table periodically or aperiodically.

In some aspects, the UE may transmit the third indication by receiving a fourth indication to transmit the third indication, where the third indication is transmitted based on the fourth indication. For example, referring to FIG. 10, at 1008, the UE 1004 may receive, from the network node 1002 an indication to transmit a preference to utilize a particular MCS table. At 1010, the UE 1004 may transmit, to the network node 1002, the indication of the preference to utilize the particular MCS table based on receiving the indication at 1008.

In some aspects, the UE may transmit a third indication to invalidate at least one entry in a first MCS table from the plurality of MCS. For example, referring to FIG. 10, at 1010, the UE 1004 may transmit a third indication to invalidate at least one entry in a first MCS table from the plurality of MCS tables.

In some aspects, the UE may transmit a third indication of a second MCS table from the plurality of MCS tables that is not to be utilized by the network node. For example, referring to FIG. 10, at 1010, the UE 1004 may transmit a third indication of a second MCS table from the plurality of MCS tables that is not to be utilized by the network node.

In some aspects, the UE may deactivate, based on the first indication, particular functionality of at least the demodulator. For example, referring to FIG. 10, at 1016, the UE 1004 may deactivate, based on the first indication transmitted at 1006, particular functionality of at least the demodulator.

At 1106, the UE may receive data from a network node based on the MCS table. For example, referring to FIG. 10, at 1018, the UE 1004 may receive data from the network node 1002 based on the MCS table indicated at 1014. In an aspect, 1106 may be performed by the complexity reducer component 198.

In some aspects, the UE may transmit a third indication, the third indication indicating at least one of a number of component carriers supported by the UE, an allocation size for each of the component carriers, or a number of slots after which the UE utilizes an MCS table indicated by the network node. For example, referring to FIG. 10, at 1006, the indication may indicate at least one of a number of component carriers supported by the UE 1004, an allocation size for each of the component carriers, or a number of slots after which the UE 1004 utilizes an MCS table indicated by the network node 1002. In other aspects, the UE 1004 may transmit another indication, for example, during, before or after 1006, that indicates at least one of component carriers supported by the UE 1004, an allocation size for each of the component carriers, or a number of slots after which the UE utilizes an MCS table indicated by the network node 1002.

In some aspects, the UE may receive a third indication to utilize an uplink MCS table for transmitting uplink data to the network node and may transmit the uplink data to the network node based on the uplink MCS table. For example, referring to FIG. 10, at 1020, the UE 1004 may receive a third indication to utilize an uplink MCS table for transmitting uplink data to the network node 1002. In some aspects, the network node 1002 may provide such an indication based on receiving an indication from the UE 1004 (e.g., at 1006) that indicates that the UE 1004 supports the capability to utilize uplink MCS table(s) indicated by the network node 1002. At 1022, the UE 1004 may transmit the uplink data to the network node 1002 based on the uplink MCS table. In some aspects, the network node 1002 may deactivate particular functionality (e.g., the demodulator, the decoder, etc.) of the network node 1002, for example, based on the uplink MCS table indicated at 1020. For example, the network node 1002 may deactivate functionality of the demodulator and/or decoder that is configured to demodulate and/or decode uplink data associated with constellations and/or code rates not indicated in the uplink MCS table indicated at 1020). Deactivating such functionality may enable the network node 1002 to conserve power, among other compute resources (e.g., processing cycles, memory, etc.).

FIG. 12 is a flowchart 1200 illustrating methods of wireless communication at a UE in accordance with various aspects of the present disclosure. In some aspects, the UE may be the UE 104, the 350, or the UE 1004, or the apparatus 1504 in the hardware implementation of FIG. 15.

At 1202, the UE may transmit a first indication that the UE supports a capability to reduce power consumption associated with a constellation and code rate of at least a demodulator of the UE. For example, referring to FIG. 10, at 1006, the UE 1004 may transmit the first indication that the UE 1004 supports a capability to reduce power consumption associated with a constellation and code rate of at least a demodulator of the UE 1004. In an aspect, 1202 may be performed by the complexity reducer component 198.

In some aspects, the first indication may include a bit that indicates that the UE supports the capability to reduce the power consumption of the demodulator of the UE. For example, referring to FIG. 10, the indication provided at 1006 may include a bit that indicates that the UE 1004 supports the capability to reduce the power consumption of the demodulator of the UE.

In some aspects, the first indication may include a first bit associated with the demodulator and indicates that the UE supports the capability to reduce the power consumption of the demodulator of the UE, and may include a second bit associated with a decoder of the UE and indicates that the UE supports the capability to reduce the power consumption of the decoder of the UE. For example, referring to FIG. 10, the indication provided at 1006 may include a first bit associated with the demodulator that indicates that the UE 1004 supports the capability to reduce the power consumption of the demodulator of the UE 1004, and may include a second bit associated with a decoder of the UE 1004 that indicates that the UE 1004 supports the capability to reduce the power consumption of the decoder of the UE 1004.

At 1204, the UE may transmit a second indication, the second indication indicating at least one of a number of component carriers supported by the UE, an allocation size for each of the component carriers, or a number of slots after which the UE utilizes an MCS table indicated by the network node. For example, referring to FIG. 10, at 1006, the second indication may indicate at least one of a number of component carriers supported by the UE 1004, an allocation size for each of the component carriers, or a number of slots after which the UE 1004 utilizes an MCS table indicated by the network node 1002. In other aspects, the UE 1004 may transmit another indication, for example, during, before or after 1006, that indicates at least one of component carriers supported by the UE 1004, an allocation size for each of the component carriers, or a number of slots after which the UE utilizes an MCS table indicated by the network node 1002. In an aspect, 1204 may be performed by the complexity reducer component 198.

At 1206, the UE may transmit a third indication to invalidate at least one entry in a first MCS table from the plurality of MCS tables. For example, referring to FIG. 10, at 1010, the UE 1004 may transmit a third indication to invalidate at least one entry in a first MCS table from the plurality of MCS tables. In an aspect, 1206 may be performed by the complexity reducer component 198.

At 1207, the UE may transmit a third indication of a second MCS table from the plurality of MCS tables that is not to be utilized by the network node. For example, referring to FIG. 10, at 1010, the UE 1004 may transmit a third indication of a second MCS table from the plurality of MCS tables that is not to be utilized by the network node. In an aspect, 1207 may be performed by the complexity reducer component 198.

At 1208, the UE may receive, based on the first indication, a fourth indication to utilize an MCS table from a plurality of MCS tables. For example, referring to FIG. 10, at 1014, the UE 1004 may receive, based on the first indication transmitted at 1006, a fourth indication to utilize an MCS table from a plurality of MCS tables. In an aspect, 1208 may be performed by the complexity reducer component 198.

In some aspects, as part of 1208, at 1210, the UE may receive the fourth indication by transmitting a fifth indication to utilize the MCS table, where the fourth indication is received based on the fifth indication. For example, referring to FIG. 10, at 1010, the UE 1004 may transmit an indication to utilize the MCS table (e.g., a preference to utilize the MCS table). In an aspect, 1210 may be performed by the complexity reducer component 198.

In some aspects, as part of 1210, at 1212, the UE may transmit the fifth indication by transmitting the fifth indication periodically or transmitting the fifth indication aperiodically. For example, referring to FIG. 10, at 1010, the UE 1004 may transmit the indication to utilize a particular MCS table periodically. In an aspect, 1212 may be performed by the complexity reducer component 198.

In some aspects, as part of 1210, at 1216, the UE may transmit the fifth indication by receiving a sixth indication to transmit the fifth indication, where the fifth indication is transmitted based on the sixth indication. For example, referring to FIG. 10, at 1008, the UE 1004 may receive, from the network node 1002 an indication to transmit a preference to utilize a particular MCS table. In an aspect, 1216 may be performed by the complexity reducer component 198.

In some aspects, as part of 1210, at 1218, the UE may transmit the fifth indication based on the sixth indication. At 1010, the UE 1004 may transmit, to the network node 1002, the indication of the preference to utilize the particular MCS table based on receiving the indication at 1008. In an aspect, 1218 may be performed by the complexity reducer component 198.

In some aspects, as part of 1208, at 1220, the UE may receive the fourth indication based on the fifth indication. For example, referring to FIG. 10, at 1014, the UE 1004 may receive the indication to utilize the MCS table (e.g., after the network node 1002 determines that such an MCS table is to be utilized, for example, at 1012). In an aspect, 1220 may be performed by the complexity reducer component 198.

At 1222, the UE may deactivate, based on the first indication, a functionality of at least the demodulator. For example, referring to FIG. 10, at 1016, the UE 1004 may deactivate, based on the first indication transmitted at 1006, a functionality of at least the demodulator. In an aspect, 1222 may be performed by the complexity reducer component 198.

At 1224, the UE may receive data from a network node based on the MCS table. For example, referring to FIG. 10, at 1018, the UE 1004 may receive data from the network node 1002 based on the MCS table indicated at 1014. In an aspect, 1224 may be performed by the complexity reducer component 198.

At 1226, the UE may receive a third indication to utilize an uplink MCS table for transmitting uplink data to the network node. For example, referring to FIG. 10, at 1020, the UE 1004 may receive a third indication to utilize an uplink MCS table for transmitting uplink data to the network node 1002. In some aspects, the network node 1002 may provide such an indication based on receiving an indication from the UE 1004 (e.g., at 1006) that indicates that the UE 1004 supports the capability to utilize uplink MCS table(s) indicated by the network node 1002. In an aspect, 1226 may be performed by the complexity reducer component 198.

At 1228, the UE may transmit the uplink data to the network node based on the uplink MCS table. For example, referring to FIG. 10, at 1022, the UE 1004 may transmit the uplink data to the network node 1002 based on the uplink MCS table. In some aspects, the network node 1002 may deactivate particular functionality (e.g., the demodulator, the decoder, etc.) of the network node 1002, for example, based on the uplink MCS table indicated at 1020. For example, the network node 1002 may deactivate functionality of the demodulator and/or decoder that is configured to demodulate and/or decode uplink data associated with constellations and/or code rates not indicated in the uplink MCS table indicated at 1020). Deactivating such functionality may enable the network node 1002 to conserve power, among other compute resources (e.g., processing cycles, memory, etc.). In an aspect, 1228 may be performed by the complexity reducer component 198.

Figure 13:
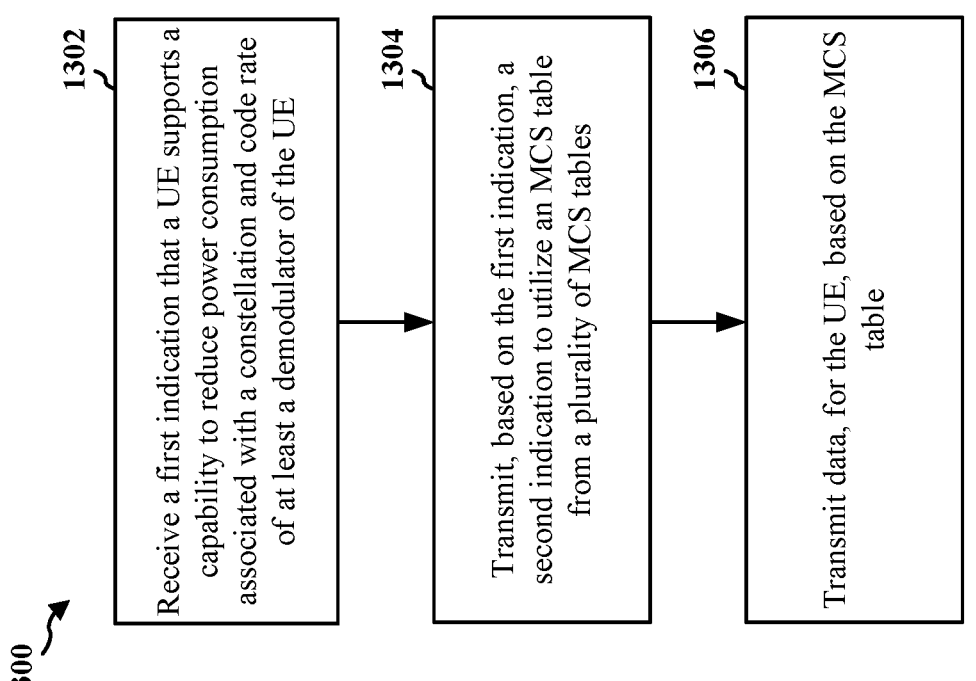
FIG. 13 is a flowchart illustrating methods of wireless communication in accordance with various aspects of the present disclosure.

FIG. 13 is a flowchart 1300 illustrating methods of wireless communication at a network node in accordance with various aspects of the present disclosure. In some aspects, the network node may be the base station 102, the base station 310, the network node 1002, or the network entity 1602 in the hardware implementation of FIG. 16.

At 1302, the network node may receive a first indication that a UE supports a capability to reduce power consumption associated with a constellation and code rate of at least a demodulator of the UE. For example, referring to FIG. 10, at 1006, the network node 1002 may receive, from the UE 1004, a first indication that the UE 1004 supports a capability to reduce power consumption associated with a constellation and code rate of at least a demodulator of the UE 1004. In an aspect, 1302 may be performed by the MCS table determiner component 199.

In some aspects, the first indication may include a bit that indicates that the UE supports the capability to reduce the power consumption of the demodulator of the UE. For example, referring to FIG. 10, the indication received at 1006 may include a bit that indicates that the UE 1004 supports the capability to reduce the power consumption of the demodulator of the UE.

In some aspects, the first indication may include a first bit associated with the demodulator and indicates that the UE supports the capability to reduce the power consumption of the demodulator of the UE, and may include a second bit associated with a decoder of the UE and indicates that the UE supports the capability to reduce the power consumption of the decoder of the UE. For example, referring to FIG. 10, the indication received at 1006 may include a first bit associated with the demodulator that indicates that the UE 1004 supports the capability to reduce the power consumption of the demodulator of the UE 1004, and may include a second bit associated with a decoder of the UE 1004 that indicates that the UE 1004 supports the capability to reduce the power consumption of the decoder of the UE 1004.

At 1304, the network node may transmit, based on the first indication, a second indication to utilize an MCS table from a plurality of MCS tables. For example, referring to FIG. 10, at 1014, the network node 1002 may transmit, based on the first indication received at 1006, a second indication to utilize an MCS table from a plurality of MCS tables. In an aspect, 1304 may be performed by the MCS table determiner component 199.

In some aspects, the network node may transmit the second indication by receiving a third indication to utilize the MCS table, where the second indication is transmitted based on the third indication. For example, referring to FIG. 10, at 1010, the network node 1002 may receive an indication to utilize the MCS table (e.g., a preference to utilize the MCS table), and at 1014, the network node 1002 may transmit the indication to utilize the MCS table (e.g., prior to receiving the second indication and/or after the network node 1002 determines that such an MCS table is to be utilized, for example, at 1012).

In some aspects, the network node may receive the third indication by receiving the third indication periodically or by receiving the third indication periodically. For example, referring to FIG. 10, at 1010, the network node 1002 may receive the indication to utilize a particular MCS table periodically or aperiodically.

In some aspects, the network node may receive the third indication by transmitting a fourth indication to transmit the third indication, where the third indication is received based on the fourth indication. For example, referring to FIG. 10, at 1008, the network node 1002 may transmit, to the UE 1004, an indication to transmit a preference to utilize a particular MCS table. At 1010, the network node 1002 may receive, from the UE 1004, the indication of the preference to utilize the particular MCS table based on transmitting the indication at 1008.

In some aspects, the network node may receive a third indication to invalidate at least one entry in a first MCS table from the plurality of MCS tables or a third indication. For example, referring to FIG. 10, at 1010, the network node 1002 may receive a third indication to invalidate at least one entry in a first MCS table from the plurality of MCS tables.

In some aspects, the network node may receive a third indication of a second MCS table from the plurality of MCS tables that is not to be utilized by the network node. For example, referring to FIG. 10, at 1010, the network node 1002 may receive a third indication of a second MCS table from the plurality of MCS tables that is not to be utilized by the network node.

In some aspects, the network node may transmit the second indication by determining the MCS table based on at least one of the first indication, a spectral efficiency of the network node, a co-existence of multiple UEs, or characteristics associated with the network node. For example, referring to FIG. 10, at 1012, the network node 1002 may determine the MCS table (indicated at 1014) based on at least one of the first indication (received at 1006), a spectral efficiency of the network node 1002, a co-existence of multiple UEs (e.g., the UE 1004), or characteristics associated with the network node 1002).

At 1306, the network node may transmit data, for the UE, based on the MCS table. For example, referring to FIG. 10, at 1018, the network node 1002 may transmit data to the UE 1004 based on the MCS table indicated at 1014. In an aspect, 1306 may be performed by the MCS table determiner component 199.

In some aspects, the network node may receive a third indication, the third indication indicating at least one of a number of component carriers supported by the UE, an allocation size for each of the component carriers, or a number of slots after which the UE utilizes the MCS table. For example, referring to FIG. 10, at 1006, the network node may receive a third indication of at least one of a number of component carriers supported by the UE 1004, an allocation size for each of the component carriers, or a number of slots after which the UE 1004 utilizes an MCS table indicated by the network node 1002. In other aspects, the network node 1002 may receive another indication, for example, during, before or after 1006, that indicates at least one of component carriers supported by the UE 1004, an allocation size for each of the component carriers, or a number of slots after which the UE utilizes an MCS table indicated by the network node 1002.

In some aspects, the network node may transmit a third indication to utilize an uplink MCS table for receiving uplink data from the UE. For example, referring to FIG. 10, at 1020, the network node 1002 may transmit a third indication to utilize an uplink MCS table for receiving uplink data from the UE 1004. In some aspects, the network node 1002 may provide such an indication based on receiving an indication from the UE 1004 (e.g., at 1006) that indicates that the UE 1004 supports the capability to utilize uplink MCS table(s) indicated by the network node 1002. In some aspects, the network node 1002 may deactivate particular functionality (e.g., the demodulator, the decoder, etc.) of the network node 1002, for example, based on the uplink MCS table indicated at 1020. For example, the network node 1002 may deactivate functionality of the demodulator and/or decoder that is configured to demodulate and/or decode uplink data associated with constellations and/or code rates not indicated in the uplink MCS table indicated at 1020). Deactivating such functionality may enable the network node 1002 to conserve power, among other compute resources (e.g., processing cycles, memory, etc.).

FIG. 14 is a flowchart 1400 illustrating methods of wireless communication at a network node in accordance with various aspects of the present disclosure. In some aspects, the network node may be the base station 102, the base station 310, the network node 1002, or the network entity 1602 in the hardware implementation of FIG. 16.

At 1402, the network node may receive a first indication that a UE supports a capability to reduce power consumption associated with a constellation and code rate of at least a demodulator of the UE. For example, referring to FIG. 10, at 1006, the network node 1002 may receive, from the UE 1004, a first indication that the UE 1004 supports a capability to reduce power consumption associated with a constellation and code rate of at least a demodulator of the UE 1004. In an aspect, 1402 may be performed by the MCS table determiner component 199.

In some aspects, the first indication may include a bit that indicates that the UE supports the capability to reduce the power consumption of the demodulator of the UE. For example, referring to FIG. 10, the indication received at 1006 may include a bit that indicates that the UE 1004 supports the capability to reduce the power consumption of the demodulator of the UE.

In some aspects, the first indication may include a first bit associated with the demodulator and indicates that the UE supports the capability to reduce the power consumption of the demodulator of the UE, and may include a second bit associated with a decoder of the UE and indicates that the UE supports the capability to reduce the power consumption of the decoder of the UE. For example, referring to FIG. 10, the indication received at 1006 may include a first bit associated with the demodulator that indicates that the UE 1004 supports the capability to reduce the power consumption of the demodulator of the UE 1004, and may include a second bit associated with a decoder of the UE 1004 that indicates that the UE 1004 supports the capability to reduce the power consumption of the decoder of the UE 1004.

At 1404, the network node may receive a second indication, the second indication indicating at least one of a number of component carriers supported by the UE, an allocation size for each of the component carriers, or a number of slots after which the UE utilizes the MCS table. For example, referring to FIG. 10, at 1006, the network node may receive a second indication of at least one of a number of component carriers supported by the UE 1004, an allocation size for each of the component carriers, or a number of slots after which the UE 1004 utilizes an MCS table indicated by the network node 1002. In other aspects, the network node 1002 may receive another indication, for example, during, before or after 1006, that indicates at least one of component carriers supported by the UE 1004, an allocation size for each of the component carriers, or a number of slots after which the UE utilizes an MCS table indicated by the network node 1002. In an aspect, 1404 may be performed by the MCS table determiner component 199.

At 1406, the network node may receive a third indication to invalidate at least one entry in a first MCS table from the plurality of MCS tables. For example, referring to FIG. 10, at 1010, the network node 1002 may receive a third indication to invalidate at least one entry in a first MCS table from the plurality of MCS tables. In an aspect, 1406 may be performed by the MCS table determiner component 199.

At 1407, the network node may receive a third indication of a third indication of a second MCS table from the plurality of MCS tables that is not to be utilized by the network node. For example, referring to FIG. 10, at 1010, the network node 1002 may receive a third indication of a second MCS table from the plurality of MCS tables that is not to be utilized by the network node. In an aspect, 1406 may be performed by the MCS table determiner component 199.

At 1408, the network node may transmit, based on the first indication, a fourth indication to utilize an MCS table from a plurality of MCS tables. For example, referring to FIG. 10, at 1014, the network node 1002 may transmit, based on the first indication received at 1006, a fourth indication to utilize an MCS table from a plurality of MCS tables. In an aspect, 1408 may be performed by the MCS table determiner component 199.

In some aspects, as part of 1408, at 1410, the network node may transmit the fourth indication by receiving a fifth indication to utilize the MCS table, where the fourth indication is transmitted based on the fifth indication. For example, referring to FIG. 10, at 1010, the network node 1002 may receive an indication to utilize the MCS table (e.g., a preference to utilize the MCS table. In an aspect, 1410 may be performed by the MCS table determiner component 199.

In some aspects, as part of 1410, at 1412, the network node may receive the fifth indication by receiving the fifth indication periodically or receiving the fifth indication aperiodically. For example, referring to FIG. 10, at 1010, the network node 1002 may receive the indication to utilize a particular MCS table periodically or aperiodically. In an aspect, 1412 may be performed by the MCS table determiner component 199.

In some aspects, as part of 1410, at 1416, the network node may receive the third indication by transmitting a fourth indication to transmit the third indication, where the third indication is received based on the fourth indication. For example, referring to FIG. 10, at 1008, the network node 1002 may transmit, to the UE 1004, an indication to transmit a preference to utilize a particular MCS table. In an aspect, 1416 may be performed by the MCS table determiner component 199.

In some aspects, as part of 1410, at 1418, the network node may receive the fifth indication based on the sixth indication. For example, referring to FIG. 10, at 1010, the network node 1002 may receive, from the UE 1004, the indication of the preference to utilize the particular MCS table based on transmitting the indication at 1008. In an aspect, 1418 may be performed by the MCS table determiner component 199.

In some aspects, as part of 1408, at 1420, the network node may transmit the fourth indication based on the fifth indication. For example, referring to FIG. 10, at 1014, the network node 1002 may transmit the indication to utilize the MCS table (e.g., after the network node 1002 determines that such an MCS table is to be utilized, for example, at 1012). In an aspect, 1420 may be performed by the MCS table determiner component 199.

In some aspects, as part of 1408, at 1422, the network node may transmit the fourth indication by determining the MCS table based on at least one of the first indication, a spectral efficiency of the network node, a co-existence of multiple UEs, or characteristics associated with the network node. For example, referring to FIG. 10, at 1012, the network node 1002 may determine the MCS table (indicated at 1014) based on at least one of the first indication (received at 1006), a spectral efficiency of the network node 1002, a co-existence of multiple UEs (e.g., the UE 1004), or characteristics associated with the network node 1002). In an aspect, 1422 may be performed by the MCS table determiner component 199.

At 1424, the network node may transmit data, for the UE, based on the MCS table. For example, referring to FIG. 10, at 1018, the network node 1002 may transmit data to the UE 1004 based on the MCS table indicated at 1014. In an aspect, 1424 may be performed by the MCS table determiner component 199.

At 1426, the network node may transmit a seventh indication to utilize an uplink MCS table for receiving uplink data from the UE. For example, referring to FIG. 10, at 1020, the network node 1002 may transmit a seventh indication to utilize an uplink MCS table for receiving uplink data from the UE 1004. In some aspects, the network node 1002 may provide such an indication based on receiving an indication from the UE 1004 (e.g., at 1006) that indicates that the UE 1004 supports the capability to utilize uplink MCS table(s) indicated by the network node 1002. In some aspects, the network node 1002 may deactivate particular functionality (e.g., the demodulator, the decoder, etc.) of the network node 1002, for example, based on the uplink MCS table indicated at 1020. For example, the network node 1002 may deactivate functionality of the demodulator and/or decoder that is configured to demodulate and/or decode uplink data associated with constellations and/or code rates not indicated in the uplink MCS table indicated at 1020). Deactivating such functionality may enable the network node 1002 to conserve power, among other compute resources (e.g., processing cycles, memory, etc.). In an aspect, 1426 may be performed by the MCS table determiner component 199.

Figure 15:
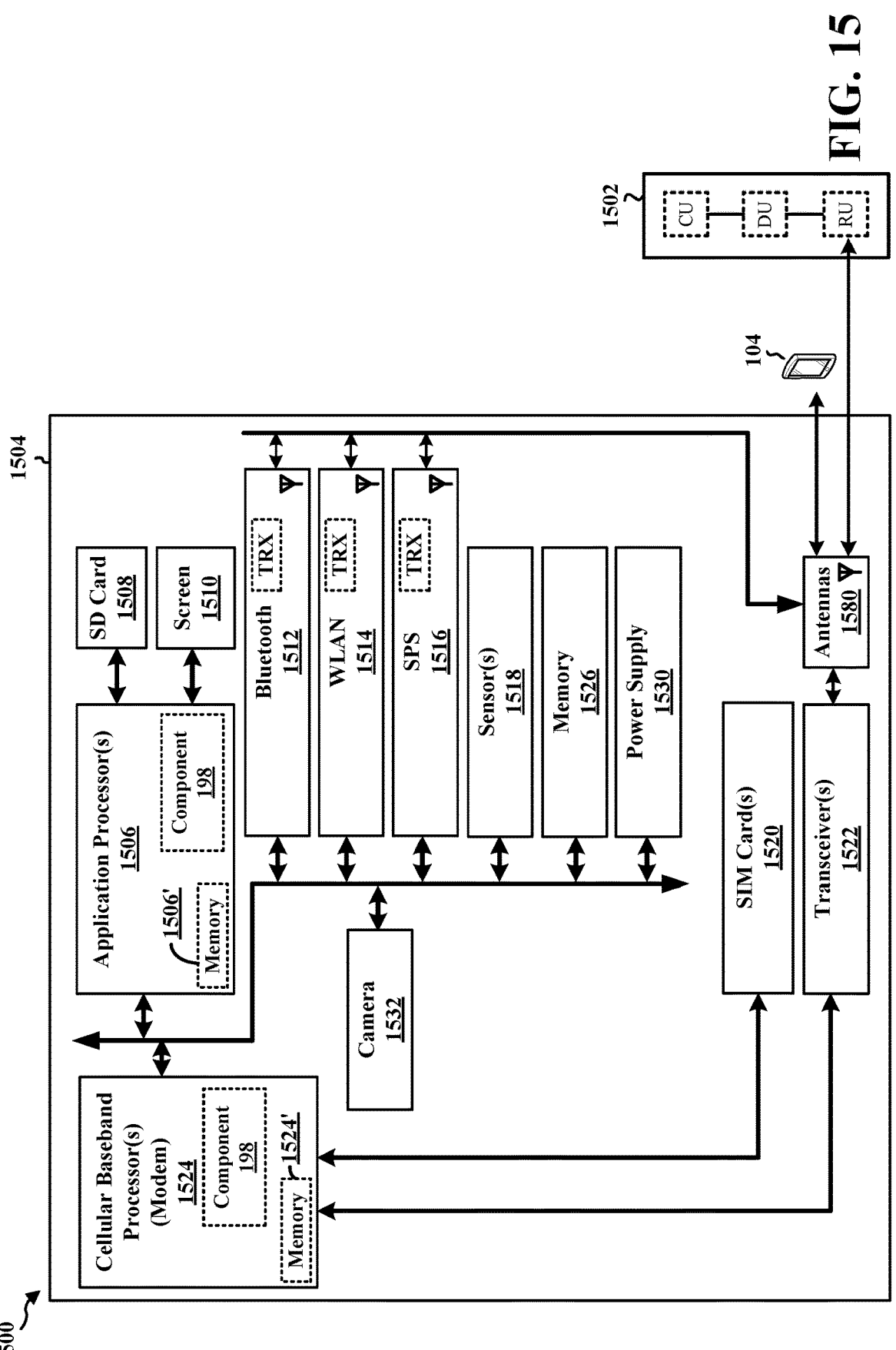
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus

1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

As discussed supra, the component 198 may be configured to transmit a first indication that the UE supports a capability to reduce power consumption associated with a constellation and code rate of at least a demodulator of the UE, to receive, based on the first indication, a second indication to utilize an MCS table from a plurality of MCS tables, and to receive data from a network node based on the MCS table. The component 198 may be configured to perform any of the aspects described in connection with the flowcharts in FIGS. 11 and 12 and/or the aspects performed by the UE 1004 in the communication flow in FIG. 10. The component 198 may be within the cellular baseband processor(s) 1524, the application processor(s) 1506, or both the cellular baseband processor(s) 1524 and the application processor(s) 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for transmitting a first indication that the UE supports a capability to reduce power consumption associated with a constellation and code rate of at least a demodulator of the UE, means for receiving, based on the first indication, a second indication to utilize an MCS table from a plurality of MCS tables, and means for receiving data from a network node based on the MCS table. The apparatus may further include means for performing any of the aspects described in connection with the flowcharts in FIGS. 11 and 12 and/or the aspects performed by the UE 1004 in the communication flow in FIG. 10. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
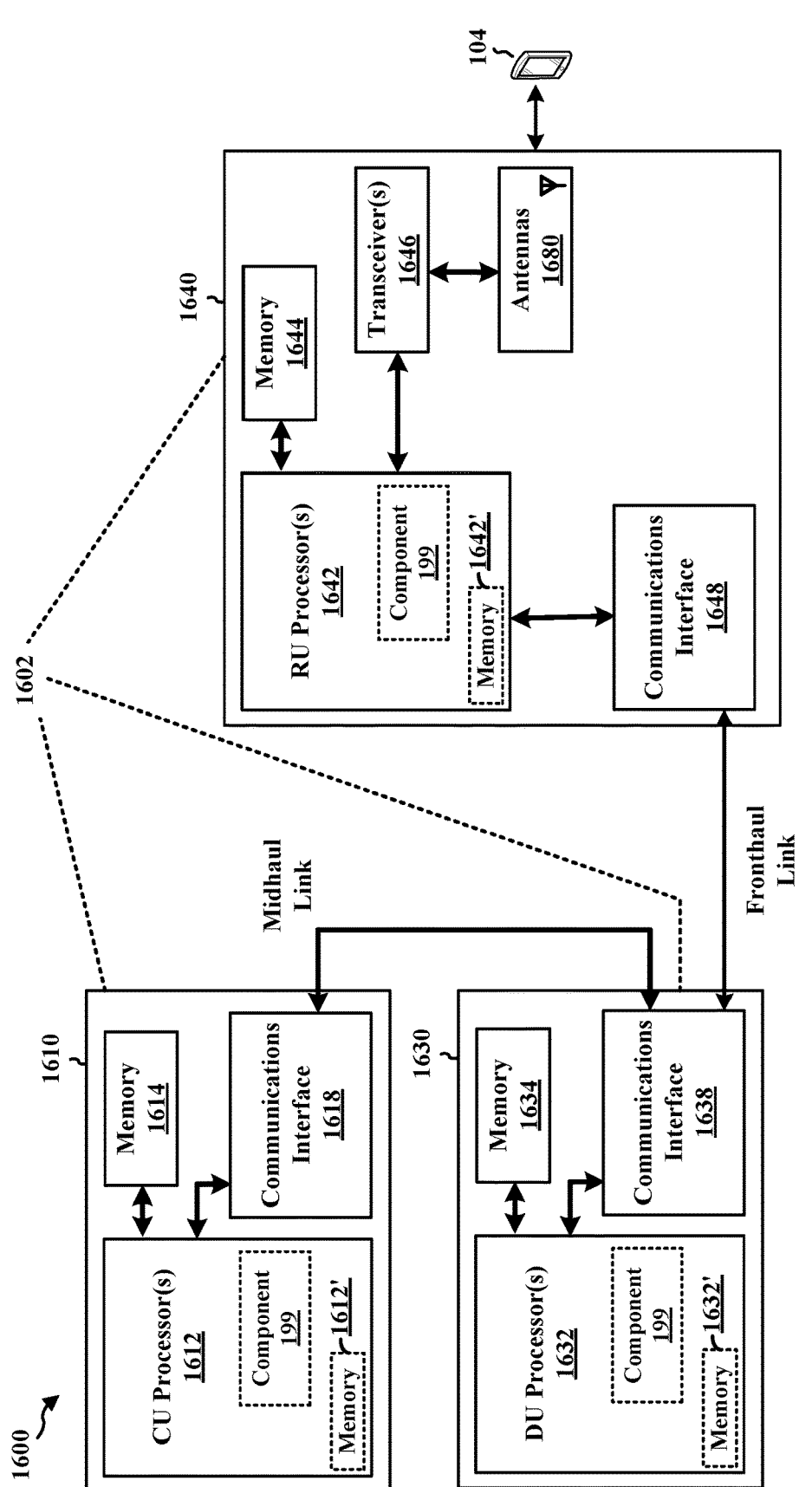
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include at least one CU processor 1612. The CU processor(s) 1612 may include on-chip memory 1612'. In some aspects, the CU 1610 may further include additional memory modules 1614 and a communications interface 1618. The CU 1610 communicates with the DU 1630 through a midhaul link, such as an F1 interface.

The DU 1630 may include at least one DU processor 1632. The DU processor(s) 1632 may include on-chip memory 1632'. In some aspects, the DU 1630 may further include additional memory modules 1634 and a communications interface 1638. The DU 1630 communicates with the RU 1640 through a fronthaul link. The RU 1640 may include at least one RU processor 1642. The RU processor(s) 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612'. 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a first indication that a UE supports a capability to reduce power consumption associated with a constellation and code rate of at least a demodulator of the UE, to transmit, based on the first indication, a second indication to utilize an MCS table from a plurality of MCS tables, and to transmit data, for the UE, based on the MCS table. The component 199 may be configured to perform any of the aspects described in connection with the flowcharts in FIGS. 13 and 14 and/or the aspects performed by the network node 1002 in the communication flow in FIG. 10. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1602 may include a variety of components configured for various functions. In one configuration, the network entity 1602 may include means for receiving a first indication that a UE supports a capability to reduce power consumption associated with a constellation and code rate of at least a demodulator of the UE, means for transmitting, based on the first indication, a second indication to utilize an MCS table from a plurality of MCS tables, and means for transmitting data, for the UE, based on the MCS table. The apparatus may further include means for performing any of the aspects described in connection with the flowcharts in FIGS. 13 and 14 and/or the aspects performed by the network node 1002 in the communication flow in FIG. 10. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Various aspects of the present disclosure, in connection with the accompanying drawings, relate generally to communication systems. Some aspects more specifically relate to changing the MCS table utilized for communication. In some examples, a UE may signal to a network node that it has the capability to reduce power consumption of one or more hardware components thereof (e.g., a demodulator, a decoder, etc.). The network node may determine whether a different MCS table is to be utilized for communication based on the UE's capability and/or along with other factors (e.g., spectral efficiency of the network node, channel characteristics associated with the network node, etc.). The different MCS table may support lower constellation(s) and/or higher code rate(s). In the event that the network node determines that a different MCS table is to be utilized, the network node may provide an indication to the UE to utilize the different MCS table and may transmit data to the UE based on the MCS table. The UE may demodulate and decode the received data based on the different MCS table.

Particular aspects of the subject matter described in this disclosure can be implemented to realize one or more of the following potential advantages. In some examples, by switching to an MCS table with lower constellation(s) and/or higher code rate(s), the demodulator of the UE may experience less errors for the decoder of the UE to correct. Accordingly, the UE works less by not having correct as many errors, and therefore, conserves various compute resources, such as processing cycles, memory, power, etc.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: transmitting a first indication that the UE supports a capability to reduce power consumption associated with a constellation and code rate of at least a demodulator of the UE; receiving, based on the first indication, a second indication to utilize a modulation and coding set (MCS) table from a plurality of MCS tables; and receiving data from a network node based on the MCS table.

Aspect 2 is the method of aspect 1, wherein receiving the second indication comprises: transmitting a third indication to utilize the MCS table, wherein the second indication is received based on the third indication.

Aspect 3 is the method of aspect 2, wherein transmitting the third indication comprises at least one of: transmitting the third indication periodically; or transmitting the third indication aperiodically.

Aspect 4 is the method of aspect 2, wherein transmitting the third indication comprises: receiving a fourth indication to transmit the third indication, wherein the third indication is transmitted based on the fourth indication.

Aspect 5 is the method of aspect 1, further comprising: receiving a third indication to utilize an uplink MCS table for transmitting uplink data to the network node; and transmitting the uplink data to the network node based on the uplink MCS table.

Aspect 6 is the method of any of aspects 1 to 5, further comprising: transmitting a third indication to invalidate at least one entry in a first MCS table from the plurality of MCS tables Aspect 7 is the method of any of aspects 1 to 5, further comprising: transmitting a third indication of a second MCS table from the plurality of MCS tables that is not to be utilized by the network node.

Aspect 8 is the method of any of aspects 1 to 7, wherein the first indication comprises a bit that indicates that the UE supports the capability to reduce the power consumption of the demodulator of the UE.

Aspect 9 is the method of any of aspects 1 to 8, wherein the first indication comprises a first bit associated with the demodulator and indicates that the UE supports the capability to reduce the power consumption of the demodulator of the UE, and wherein the first indication comprises a second bit associated with a decoder of the UE and indicates that the UE supports the capability to reduce the power consumption of the decoder of the UE.

Aspect 10 is the method of any of aspects 1 to 9, further comprising: transmitting a third indication, the third indication indicating at least one of: a number of component carriers supported by the UE; an allocation size for each of the component carriers; or a number of slots after which the UE utilizes the MCS table.

Aspect 11 is the method of any of aspects 1 to 10, further comprising: deactivating, based on the first indication, a functionality of at least the demodulator.

Aspect 12 is a method of wireless communication at a network node, comprising: receiving a first indication that a user equipment (UE) supports a capability to reduce power consumption associated with a constellation and code rate of at least a demodulator of the UE; transmitting, based on the first indication, a second indication to utilize a modulation and coding set (MCS) table from a plurality of MCS tables; and transmitting data, for the UE, based on the MCS table.

Aspect 13 is the method of aspect 12, wherein receiving the second indication comprises: receiving a third indication to utilize the MCS table, wherein the second indication is transmitted based on the third indication.

Aspect 14 is the method of aspect 13, wherein receiving the third indication comprises at least one of: receiving the third indication periodically; or receiving the third indication aperiodically Aspect 15 is the method of aspect 13, wherein receiving the third indication comprises: transmitting a fourth indication to transmit the third indication, wherein the third indication is received based on the fourth indication.

Aspect 16 is the method of any of aspects 12 to 16, further comprising: transmitting a third indication to utilize an uplink MCS table for receiving uplink data from the UE.

Aspect 17 is the method of any of aspects 12 to 16, further comprising: receiving a third indication to invalidate at least one entry in a first MCS table from the plurality of MCS tables Aspect 18 is the method of any of aspects 12 to 16, further comprising: receiving a third indication of a second MCS table from the plurality of MCS tables that is not to be utilized by the network node.

Aspect 19 is the method of any of aspects 12 to 18, wherein the first indication comprises a bit that indicates that the UE supports the capability to reduce the power consumption of the demodulator of the UE.

Aspect 20 is the method of any of aspects 12 to 19, wherein the first indication comprises a first bit associated with the demodulator and indicates that the UE supports the capability to reduce the power consumption of the demodulator of the UE, and wherein the first indication comprises a second bit associated with a decoder of the UE and indicates that the UE supports the capability to reduce the power consumption of the decoder of the UE.

Aspect 21 is the method of any of aspects 12 to 20, further comprising: receiving a third indication, the third indication indicating at least one of: a number of component carriers supported by the UE; an allocation size for each of the component carriers; or a number of slots after which the UE utilizes the MCS table.

Aspect 22 is the method of any of aspects 12 to 20, wherein transmitting the second indication comprises: determining the MCS table based on at least one of: the first indication; a spectral efficiency of the network node; a co-existence of multiple UEs; or channel characteristics associated with the network node.

Aspect 23 is an apparatus for wireless communication at a UE. The apparatus includes at least one memory; and at least one processor coupled to the at least one memory and, based at least in part on information stored in the at least one memory, the at least one processor, individually or in any combination, is configured to implement any of aspects 1 to 11.

Aspect 24 is the apparatus of aspect 23, further including at least one of a transceiver or an antenna coupled to the at least one processor.

Aspect 25 is an apparatus for wireless communication at a network node. The apparatus includes at least one memory; and at least one processor coupled to the at least one memory and, based at least in part on information stored in the at least one memory, the at least one processor, individually or in any combination, is configured to implement any of aspects 12 to 22.

Aspect 26 is the apparatus of aspect 25, further including at least one of a transceiver or an antenna coupled to the at least one processor.

Aspect 27 is an apparatus for wireless communication including means for implementing any of aspects 1 to 11.

Aspect 28 is an apparatus for wireless communication including means for implementing any of aspects 12 to 22.

Aspect 29 is a computer-readable medium (e.g., a non-transitory computer-readable medium) storing computer executable code, where the code when executed by at least one processor causes the at least one processor, individually or in any combination, to implement any of aspects 1 to 11.

Aspect 30 is a computer-readable medium (e.g., a non-transitory computer-readable medium) storing computer executable code, where the code when executed by at least one processor causes the at least one processor, individually or in any combination, to implement any of aspects 12 to 22.

What is claimed is:

1. An apparatus for wireless communication at a user equipment (UE), comprising:
   at least one memory; and
   at least one processor coupled to the at least one memory and, based at least in part on information stored in the at least one memory, the at least one processor is configured to:
      transmit a first indication that the UE supports a capability to reduce power consumption based on a constellation and a code rate of a demodulator of the UE;

receive, based on the first indication, a second indication to utilize a first modulation and coding set (MCS) table from a plurality of MCS tables, wherein a second MCS table from the plurality of MCS tables comprises a higher order constellation and a lower code rate than the first MCS table; and receive data from a network node based on the demodulator and the first MCStable.

2. The apparatus of claim 1, wherein the at least one processor is further configured to:
   transmit a third indication of a preference to utilize the first MCS table before a reception of the second indication.

3. The apparatus of claim 1, wherein the at least one processor is further configured to:
   receive additional data from the network node based on the demodulator and the second MCS table before a reception of the second indication.

4. The apparatus of claim 2, wherein the at least one processor is further configured to:
   receive a fourth indication to transmit the third indication before a transmission of the third indication.

5. The apparatus of claim 1, wherein the at least one processor is further configured to:
   receive a third indication to utilize an uplink MCS table from the plurality of MCS tables, wherein a third MCS table from the plurality of MCS tables comprises a second higher order constellation and a second lower code rate than the uplink MCS table; and
   transmit uplink data based on a modulator of the UE and the uplink MCS table.

6. The apparatus of claim 1, wherein the at least one processor is further configured to:
   transmit a third indication of a lack of preference to utilize a third MCS table from the plurality of MCS tables, wherein the first MCS table and the third MCS table are different.

7. The apparatus of claim 5, wherein the at least one processor is further configured to:
   transmit additional uplink data based on the modulator of the UE and the third MCS table before a reception of the third indication.

8. The apparatus of claim 1, wherein the first indication comprises a bit that indicates that the UE supports the capability to reduce the power consumption of the demodulator of the UE.

9. The apparatus of claim 1, wherein the first indication comprises a firstbit associated with the demodulator and indicates that the UE supports the capability to reduce the power consumption of the demodulator of the UE, and wherein the first indication comprises a second bit associated with a decoder of the UE and indicates that the UE supports the capability to reduce the power consumption of the decoder of the UE, wherein the at least one processor is further configured to:
   receive, based on the second bit of the first indication, a third indication to utilize a third MCS table from the plurality of MCS tables, wherein a fourth MCS table from the plurality of MCS tables comprises a second higher order constellation and a second lower code rate than the third MCS table; and
   receive additional data from the network node based on the decoder and the third MCS table.

10. The apparatus of claim 1, wherein the at least one processor is further configured to:

transmit a third indication before a reception of the second indication, wherein the third indication indicates at least one of:

a number of component carriers supported by the UE;

an allocation size for each of the component carriers; or a number of slots after which the UE utilizes the first MCS table.

11. The apparatus of claim 1, wherein the at least one processor is further configured to:

deactivate, based on the firstindication, a functionality of the demodulator, wherein the functionality is associated with a set of MCS tables from the plurality of MCS tables, wherein the set of MCS tables do not comprise the first MCS table.

12. An apparatus for wireless communication at a network node, comprising:

at least one memory; and at least one processor coupled to the at least one memory and, based at least in part on information stored in the at least one memory, the at least one processor is configured to:

receive a first indication that a user equipment (UE) supports a capability to reduce power consumption based on a constellation and a code rate of a demodulator of the UE;

select, from a plurality of MCS tables, a first MCS table based on the first indication, wherein a second MCS table from the plurality of MCS tables comprises a higher order constellation and a lower code rate than the first MCS table;

transmit, based on the first indication, a second indication to utilize the selected first MCS table from the plurality of MCS tables; and transmit data, for the UE, based on a modulator and the first MCS table.

13. The apparatus of claim 12, wherein the at least one processor is further configured to:

receive a third indication of a preference to utilize the first MCS table, wherein to select, from the plurality of MCS tables, the first MCS table, the at least one processor is configured to:

select, from the plurality of MCS tables, the first MCS table based on the third indication.

14. The apparatus of claim 13, wherein the at least one processor is further configured to:

transmit additional data, for the UE, based on the modulator and the second MCS table before a transmission of the second indication.

15. The apparatus of claim 13, wherein the at least one processor is further configured to:

transmit a fourth indication to transmit the third indication before a reception of the third indication.

16. The apparatus of claim 12, wherein the at least one processor is further configured to:

select an uplink MCS table from the plurality of MCS tables, wherein a third MCS table from the plurality of MCS tables comprises a second higher order constellation and a second lower code rate than the uplink MCS table;

transmit a third indication to utilize the selected uplink MCS table from the plurality of MCS tables; and receive uplink data based on a second demodulator of the network node and the selected uplink MCS table.

17. The apparatus of claim 12, wherein the at least one processor is further configured to:

receive a third indication of a lack of preference to utilize a third MCS table from the plurality of MCS tables, wherein, to select, from the plurality of MCS tables, the first MCS table, the at least one processor is configured to:

refrain from a selection of the third MCS table.

18. The apparatus of claim 16, wherein the at least one processor is further configured to:

receive additional uplink data based on the demodulator of the network node and the third MCS table before a transmission of the third indication.

19. The apparatus of claim 12, wherein the first indication comprises a bit that indicates that the UE supports the capability to reduce the power consumption of the demodulator of the UE.

20. The apparatus of claim 12, wherein the first indication comprises a first bit associated with the demodulator and indicates that the UE supports the capability to reduce the power consumption of the demodulator of the UE, and wherein the first indication comprises a second bit associated with a decoder of the UE and indicates that the UE supports the capability to reduce the power consumption of the decoder of the UE, wherein the at least one processor is further configured to:

select, based on the second bit of the first indication, a third MCS table from the plurality of MCS tables, wherein a fourth MCS table from the plurality of MCS tables comprises a second higher order constellation and a second lower code rate than the third MCS table:

transmita third indication to utilize the selected third MCS table from the plurality of MCS tables; and transmit additional data, for the UE, based on an encoder and the third MCS table.

21. The apparatus of claim 12, wherein the at least one processor is further configured to:

receive a third indication before a transmission of the second indication, wherein the third indication indicates at least one of:

a number of component carriers supported by the UE;

an allocation size for each of the component carriers; or a number of slots after which the UE utilizes the first MCS table.

22. The apparatus of claim 12, wherein, to select, from the plurality of MCS tables, the first MCS table based on the first indication, the at least one processor is configured to:

select, from the plurality of MCS tables, the first MCS table based on at least one of:

a spectral efficiency of the network node;

a co-existence of multiple UEs, wherein the multiple UEs comprises the UE; or channel characteristics associated with the network node.

23. A method of wireless communication at a user equipment (UE), comprising:

transmitting a first indication that the UE supports a capability to reduce power consumption based on a constellation and a code rate of a demodulator of the UE;

receiving, based on the first indication, a second indication to utilize a first modulation and coding set (MCS) table from a plurality of MCS tables, wherein a second MCS table from the plurality of MCS tables comprises a higher order constellation and a lower code rate than the first MCS table; and receiving data from a network node based on the demodulator and the first MCS table.

24. The method of claim 23, further comprising:

transmitting a third indication to utilize the MCS table before a reception of the second indication.

25. The method of claim 23, further comprising:

receiving additional data from the network node based on the demodulator and the second MCS table before a reception of the second indication.

26. The method of claim 24, further comprising:

receiving a fourth indication to transmit the third indication before a transmission of the third indication.

27. The method of claim 23, further comprising:

receivinga third indication to utilize an uplink MCS table from the plurality of MCS tables, wherein a third MCS table from the plurality of MCS tables comprises a second higher order constellation and a second lower code rate than the uplink MCS table; and transmitting uplink data based on a modulator of the UE and the uplink MCS table.

28. A method of wireless communication at a network node, comprising:

receivinga firstindication thata user equipment (UE) supports a capability to reduce power consumption based on a constellation and a code rate of a demodulator of the UE;

selecting, from a plurality of MCS tables, a first MCS table based on the first indication, wherein a second MCS table from the plurality of MCS tables comprises a higher order constellation and a lower code rate than the first MCS table;

transmitting, based on the first indication, a second indication to utilize the selected first MCS table from the plurality of MCS tables; and transmitting data, for the UE, based on a modulator and the first MCS table.

29. The method of claim 28, wherein receiving the second indication comprises:

receivinga third indication of a preference to utilize the first MCS table, wherein selecting from the plurality of MCS tables, the first MCS table, comprises:

selecting, from the plurality of MCS tables, the first MCS table based on the third indication.

30. The method of claim 29, wherein receiving the third indication comprises at least one of:

transmitting additional data, for the UE, based on the modulator and the second MCS table before a transmission of the second indication.

* * * * *